United States Patent
Sudo et al.

(10) Patent No.: US 6,298,384 B1
(45) Date of Patent: *Oct. 2, 2001

(54) DATA PROCESSING APPARATUS FOR TRANSFERRING DATA OVER UNIDIRECTIONAL BUS

(75) Inventors: Kiyoshi Sudo; Hiroyuki Imoto; Takatoshi Katoh; Shingo Iguchi, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/604,260

(22) Filed: Jun. 27, 2000

Related U.S. Application Data

(63) Continuation of application No. 09/112,197, filed on Jul. 9, 1998, now Pat. No. 6,088,735.

(30) Foreign Application Priority Data

Nov. 10, 1997 (JP) .................................................... 9-307335

(51) Int. Cl.[7] ....................................................... G06F 13/00
(52) U.S. Cl. ........................ 709/232; 709/213; 709/238; 710/21
(58) Field of Search .................................... 709/212, 213, 709/216, 220, 230, 232, 237, 238, 250, 251, 252, 253

(56) References Cited

U.S. PATENT DOCUMENTS

| | | | |
|---|---|---|---|
| 4,968,977 | * 11/1990 | Chinnaswamy et al. | 340/825.8 |
| 5,386,585 | * 1/1995 | Traylor | 710/127 |
| 5,636,210 | * 6/1997 | Agrawal | 370/390 |
| 5,655,090 | * 8/1997 | Weingart | 712/25 |
| 5,999,992 | * 12/1999 | Grohoski et al. | 710/29 |

FOREIGN PATENT DOCUMENTS

| | | |
|---|---|---|
| 58-127246 | 7/1983 | (JP) . |
| 59-195747 | 11/1984 | (JP) . |
| 60-179871 | 9/1985 | (JP) . |
| 4-113444 | 4/1992 | (JP) . |

* cited by examiner

Primary Examiner—Viet D. Vu
(74) Attorney, Agent, or Firm—Staas & Halsey, LLP

(57) ABSTRACT

The present invention provides a system in which adjoining modules are connected with a bus so that unidirectional data transfer through modules each having a CPU and a shared memory can be realized, and in this system controls are provided so that data from adjoining modules and data form a CPU or a shared memory in the module is simultaneously transferred by a switch in the module according to a destination for transfer.

16 Claims, 24 Drawing Sheets

| | CONDITION FOR MATCHING | sel. IN. to. OUT (ITO) | sel. M. to. OUT (MTO) | sel. P. to. OUT (PTO) | sel. IN. to. M (ITM) | sel. P. to. M (PTM) | sel. IN. to. P (ITP) | sel. M. to. P (MTP) |
|---|---|---|---|---|---|---|---|---|
| PARTNER NUMBER SECTION IN ADDRESS INFORMATION IA | = M0 | 0 | — | — | 1 | — | 0 | — |
| | = P0 | 0 | — | — | 0 | — | 1 | — |
| | ≠ M0, P0 | 1 | — | — | 0 | — | 0 | — |
| PARTNER NUMBER SECTION IN ADDRESS INFORMATION IA | = M0 | — | — | 0 | — | 1 | — | — |
| | ≠ M0 | — | — | 1 | — | 0 | — | — |
| PARTNER NUMBER SECTION IN ADDRESS INFORMATION IA | = P0 | — | 0 | — | — | — | — | 1 |
| | ≠ P0 | — | 1 | — | — | — | — | 0 |

FIG. 4

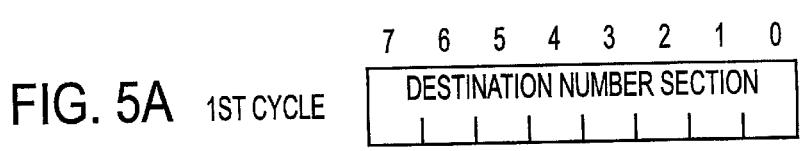
FIG. 5A 1ST CYCLE
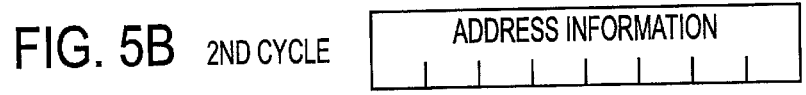
FIG. 5B 2ND CYCLE
FIG. 5C 3RD CYCLE
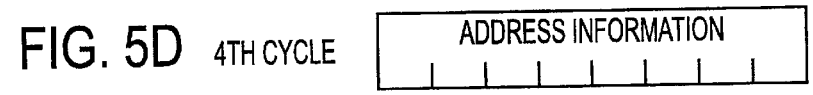
FIG. 5D 4TH CYCLE
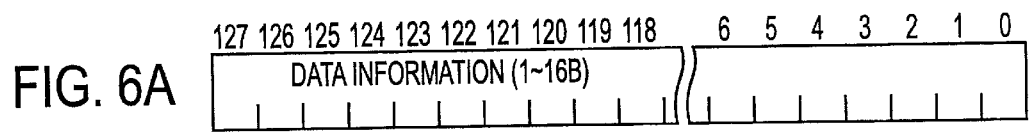
FIG. 6A
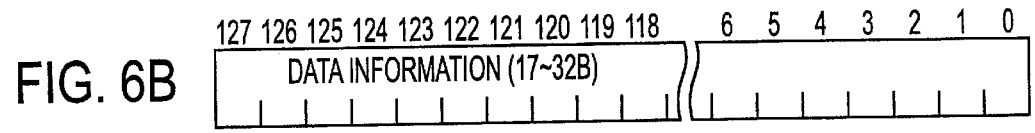
FIG. 6B
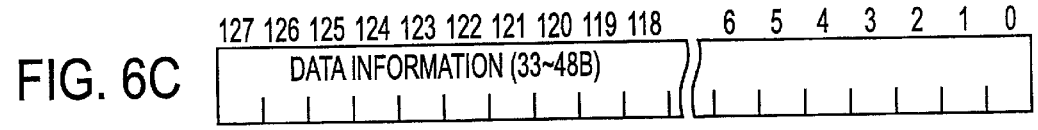
FIG. 6C
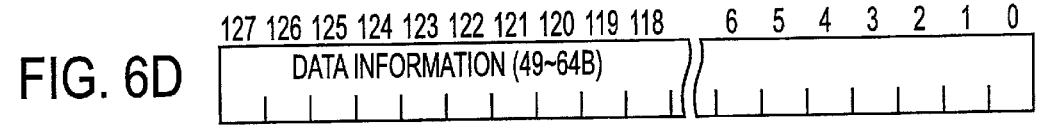
FIG. 6D

|      | τ1 | τ2 | τ3 | τ4 | τ5 | τ6 | τ7 | τ8 | τ9 | τ10 | τ11 | τ12 | τ13 | τ14 |
|------|----|----|----|----|----|----|----|----|----|-----|-----|-----|-----|-----|
| DT0  | X  | (1) P0→M1 |  |  | X | (5) P0→M2 |  |  | X |  | X | (8) P3→M1 |  | X |
| DT1  | X  | (2) P1→M2 |  |  | X | X | (5) P0→M2 |  |  | X | (6) P1→M3 |  |  | X |
| DT2  | X  | (3) P2→M3 |  |  | X | (7) P2→M0 |  |  | X |  | X | (6) P1→M3 |  | X |
| DT3  | X  | (4) P3→M0 |  |  | X | X | (7) P2→M0 |  |  | X | (8) P3→M1 |  |  | X |

FIG. 7

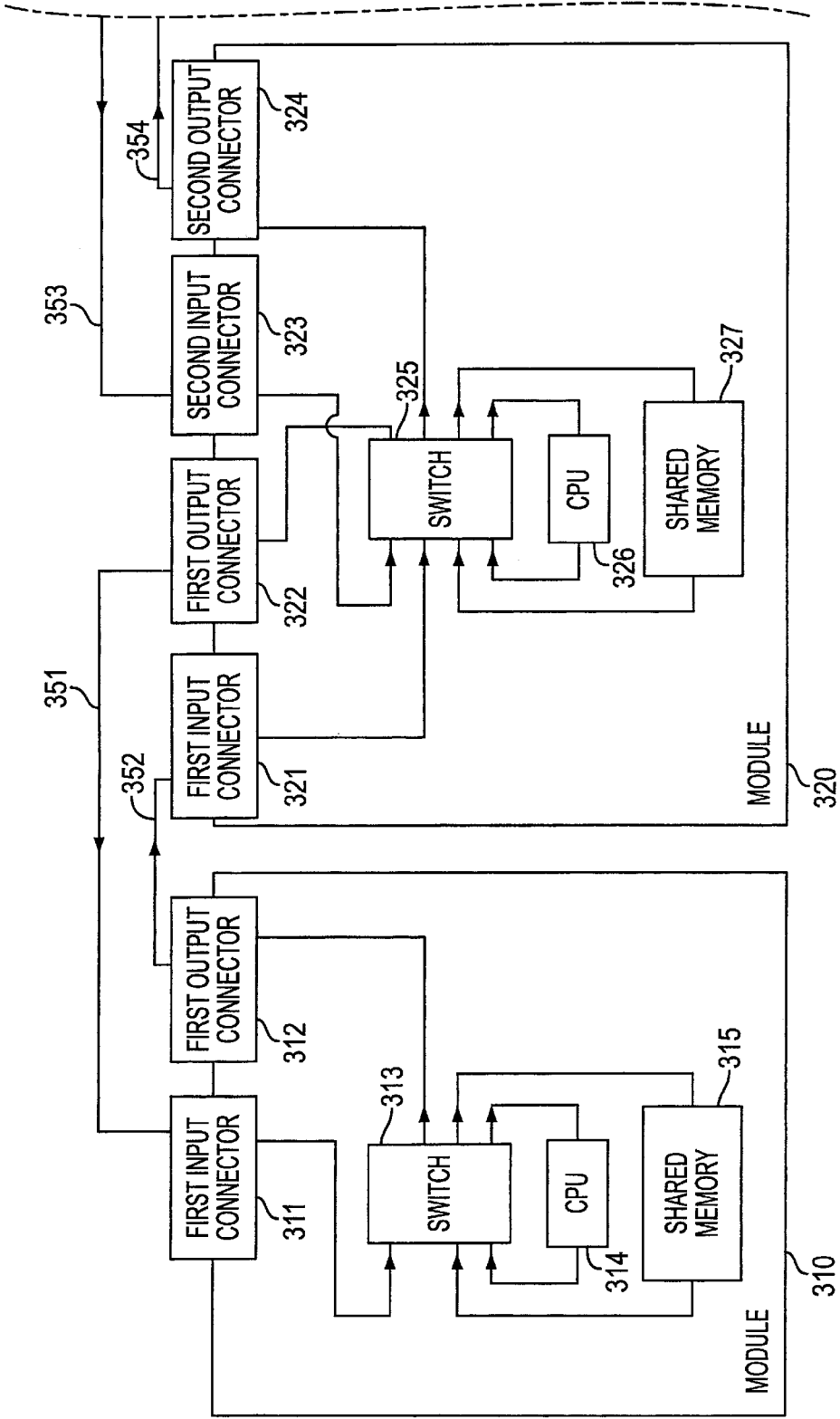

DATA PROCESSING APPARATUS FOR TRANSFERRING DATA OVER UNIDIRECTIONAL BUS

This Application is a con't of Ser. No. 09/112,197 filed Jul. 9, 1998 U.S. Pat. No. 6,088,735.

FIELD OF THE INVENTION

The present invention relates to a data processing apparatus enabling scalable improvement in performance by adding data processing modules, and more particularly to a data processing apparatus with data transfer efficiency in a data processing module and between data processing modules improved to maximum.

BACKGROUND OF THE INVENTION

In association with increase in the scale of data processing in recent years, demand for high performance data processing system is increasing. To realize high performance in data processing, it is needless to say that performance of a CPU must be improved, but, also as improvement in performance of data transfer between a CPU and a main memory, especially between those in different data processing modules largely contributes to improvement in performance of the entire system, so that there is a strong demand for development of a means for improving performance in data transfer with low cost.

FIG. 23 is a block diagram showing a data processing apparatus based on the conventional technology. In FIG. 23, the reference numerals 651, 652 indicate a common bus respectively, and the reference numerals 610, 620, 630, and 640 indicate a processing module (hereafter only module) respectively. The modules 610, 620, 630, and 640 are connected in parallel to and share common buses 651, 652 for processing and transferring data.

The module 610 has an I/O connector 611 connected to the common bus 651 and an I/O connector 612 connected to the common bus 652 and connects the modules to a back plane. This module 610 further comprises a common bus control circuit 613 for controlling the common buses 651 and 652, a CPU 614 for providing controls over, for instance, data processing in the module itself, and a shared memory 615 allowing access not only from CPU in the module but also from CPUs of other modules.

The module 620 has an I/O connector 621 connected to the common bus 651 and an I/O connector 622 connected to the common bus 652 and connects the modules to a back plane. This module 620 further comprises a common bus control circuit 623 for controlling the common buses 651 and 652, a CPU 624 for providing controls over, for instance, data processing in the module itself, and a shared memory 625 allowing access not only from CPU in the module but also from CPUs of other modules.

The module 630 has an I/O connector 631 connected to a common bus 651 and an I/O connector 632 connected to a common bus 652, and connects the modules to a back plane. This module 630 further comprises a common bus control circuit 633 for controlling the common buses 651 and 652, a CPU 634 for providing controls over, for instance, data processing in the module itself, and a shared memory 635 allowing access not only from CPU in the module but also from CPUs of other modules.

The module 640 has an I/O connector 641 connected to a common bus 651 and an I/O connector 642 connected to a common bus 652, and connects the modules to a back plane.

This module 640 further comprises a common bus control circuit 643 for controlling the common buses 651 and 652, a CPU 644 for providing controls over, for instance, data processing in the module itself, and a shared memory 645 allowing access not only from a CPU in the module but also from CPUs of other modules.

Each of the modules 610 to 640 access a shared memory in the module or in any other module using the common bus 651 or 652. As for the access right to the common bus, a common bus arbitrating circuit provide controls, and only one module can occupy a common bus at one time.

Next, description is made for operations. FIG. 24 and FIG. 25 are time charts for describing the timing of the data transfer in the data processing apparatus shown in FIG. 23. Herein, description is made for an operation timing in a case of estimating a time required for each of the CPUs 614, 624, 634, 644 to access all of other shared memories in all of the modules 610, 620, 630, and 640 with reference to FIG. 23 and FIG. 24.

In FIG. 24 and FIG. 25, P0 to P3 indicates the CPUs 614, 624, 634, and 644 with a serial numbers of P, while M0 to M3 indicates the shared memories 615, 625, 636 and 645 with serial a numbers of M respectively. τ indicates one cycle (e.g., 12 ns), while DC indicates a dummy cycle.

In FIG. 24 and FIG. 25, to execute all the accesses of (1) P0 to M1, (2) P1 to M2, (3) P2 to M3, (4) P3 to M0, (5) P0 to M2, (6) P1 to M3, (7) P2 to M0, (8) P3 to M1, (9) P0 to M3, (10) P1 to M0, (11) P2 to M1, and (12) P3 to M2, the access (1), (3), (5), (7) and (11) is executed in the common bus 651, and the accesses (2), (4), (6), (8) and (12) is executed in the common bus 652.

The entire cycle including all of these accesses can be estimated as follows. Namely, assuming that the common buses 651 and 652 are 16-byte buses respectively, and that 64-byte data is transferred by accessing a memory once, 4τ (4 cycles) is occupied by either one of the common buses 651 or 652, and 16 bytes×4=64 byte-data is transferred.

It should be noted that any of the common buses 651 and 652 constitute a two-directional common bus, so that it is necessary to insert an empty cycle of 1τ between each operation for transfer to prevent bus fight.

Assuming what was described above, a cycle required for executing the processing for accesses (1) to (12) is, as shown in the time charts in FIG. 24 and FIG. 25, 30τ from τ1 to τ30. In each of the common buses 651 and 652, 6 dummy cycles are inserted during this 30τ. Accordingly, assuming that 1τ is equal to 12 ns, the data transfer capacity of this system as a whole is computed as follows:

$$64 \text{ bytes} \times 12 \text{ times}/(12 \text{ ns} \times 30\tau) = 2.1 \text{ GB/s}$$

In the data processing apparatus as described above, however, the common buses 651 and 652 are based on a parallel bus structure, so that any of the buses is connected to all modules, and at the same time the total bus line length includes a branch length in each module. For this reason, the total line length is long and time required for signal propagation therethrough becomes longer, and in addition as the common buses 651 and 652 are two-directional common buses, so that it is impossible to omit an empty cycle of 1τ to be inserted between each transfer for prevention of bus fight when a transfer direction is switched.

For the reasons as described above, it is impossible to further reduce the minimum number of cycles required for data transfer, and also it is extremely difficult to further shorten a time required for one cycle. As a result, a frequency of memory access/volume of transferred data increases with an increase in the performance of the CPU, so that performance of a CPU itself has been improved, but performance of the system as a whole has not been improved.

SUMMARY OF THE INVENTION

It is an object of the present invention to provide, to solve the problems in the conventional technology, a data processing apparatus in which the data transfer capability can be improved with a low cost configuration for upgrading performance of the system as a whole.

With the present invention, in module junction with unidirectional data transfer, transfer control is provided in one direction according to inputted data, data processing to be executed, and each destination for transfer, so that the data transfer capability is improved even with low cost configuration, and with this feature it is possible to upgrade performance of a system as a whole.

With the invention, in module junction with a two-directional data transfer, transfer control is simultaneously provided in two-directional mode according to inputted data, data processing to be executed, and each destination for transfer, so that the data transfer capability is improved even with low cost configuration, and with this feature it is possible to upgrade performance of a system as a whole.

With the present invention, a destination for transfer is determined according to address information correlated to the data to be transferred, so that complicated processing is not required to be performed internally, and with this feature transfer control can easily be realized.

With the present invention, data inputted from outside and data having been subjected to data processing and stored are simultaneously switched to a destination for transfer, so that there is no conflict between data, and with this feature transfer control can smoothly be realized.

With the present invention, before data is transmitted, address information correlated to the data is transmitted, so that it is possible to establish a path for the data before transmission of the data.

With the invention, each data processing module is jointed to another data processing module adjoining thereto with a bus, so that, when data is successively transferred through data processing modules, the data transfer can simultaneously be controlled by each data processing modules.

With the present invention, of data processing modules, at least a data processing module jointed to a data processing module which is two or more modules ahead is included, so that, when a destination for transfer is a data processing module which is two or more modules ahead, data can directly be transmitted to this data processing module by escaping the module in between, and with this feature a time required for data transfer can be shortened.

With the present invention, a plurality of data processing modules are connected serially with a bus, and a transfer direction is reversed at each of data processing modules at both ends, so that bus line length between modules can be kept at a required minimum length, and with this feature there is no line path requiring an extremely long time for data transfer between modules and time required for data transfer can be shortened.

With the present invention, a plurality of data processing modules are connected in a circular form with a bus, so that not only bus line length between the modules can be kept at a required minimum length, but also, different from a case in which the modules are connected serially with bus, data can directly be transferred between the modules at both ends, and with this feature a time for data transfer between the modules at both ends can substantially be reduced.

With the invention, a dummy module not used for processing and storing data is included in a plurality of data processing modules, so that a module used only for data transfer can be incorporated, and with this feature free data transfer between all the modules included in a system well adapted to a small scale system can be realized.

Other objects and features of this invention will become clear from the following description with reference to the accompanying drawings.

BRIEF DESCRIPTION OF THE DRAWINGS

FIG. 4 is a view for explaining switching control according to Embodiment 1;

FIGS. 5A to 5D are views for explaining format of an address section in Embodiment 1;

FIGS. 6A to 6D are views for explaining format of a data section in Embodiment 1;

FIG. 7 is a time chart of one operation in Embodiment 1;

DESCRIPTION OF THE PREFERRED EMBODIMENTS

Detailed description is made hereinafter for preferred embodiments of a data processing apparatus according to the present invention with reference to the related drawings.

Figure 1:
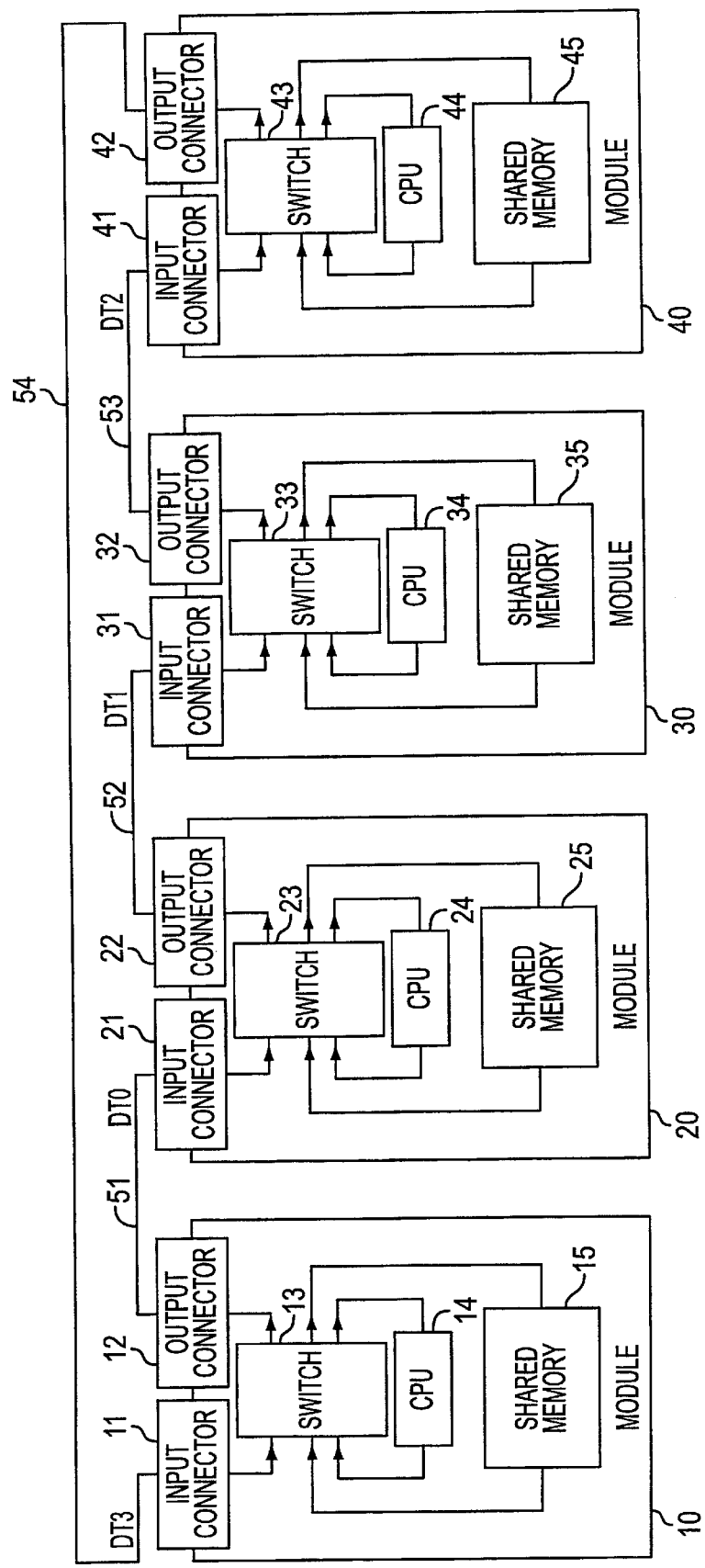
FIG. 1 is a block diagram showing a data processing apparatus according to Embodiment 1 of the present invention.

At first, description is made for the configuration. FIG. 1 is a block diagram showing a data processing apparatus according to Embodiment 1 of the present invention. In FIG. 1, designated at the reference numeral 10, 20, 30 and 40 are modules respectively, at 51, 52, 53 and 54 are unidirectional buses each connecting the modules 10 and 20, the modules 20 and 30, the modules 30 and 40, and the modules 40 and 10 respectively. The reference numerals DT0, DT1, DT2 and DT3 indicate data transferred through the unidirectional buses 51, 52, 53 and 54 respectively.

The module 10 comprises an input connector 11 connected to the unidirectional bus 54 and used only for data input, and an output connector 12 connected to the unidirectional bus 51 and used only for data output. Inputted in the input connector 11 is data DT3 sent from the module 40 through the unidirectional bus 54.

This module 10 further comprises a switch 13 for switching between the unidirectional buses 54 and 51, a CPU 14 for providing controls over, for instance, data processing in the module itself, and a shared memory 15 allowing access not only from a CPU in the module but also from CPUs of other modules.

The module 20 comprises an input connector 21 connected to the unidirectional bus 51 and used only for data input, and an output connector 22 connected to the unidirectional bus 52 and used only for data output. Inputted in the input connector 21 is data DT0 sent from the module 10 through the unidirectional bus 51.

This module 20 further comprises a switch 23 for switching between the unidirectional buses 51 and 52, a CPU 24 for providing controls over, for instance, data processing in the module itself, and a shared memory 25 allowing access not only from a CPU in the module but also from CPUs of other modules.

The module 30 comprises an input connector 31 connected to the unidirectional bus 52 and used only for data input, and an output connector 32 connected to the unidirectional bus 53 and used only for data output. Inputted in the input connector 31 is data DT1 sent from the module 20 through the unidirectional bus 52. This module 30 further comprises a switch 33 for switching between the unidirectional buses 52 and 53, a CPU 34 for providing controls over, for instance, data processing in the module itself, and a shared memory 35 allowing access not only from a CPU in the module but also from CPUs of other modules.

The module 40 comprises an input connector 41 connected to the unidirectional bus 53 and used only for data input, and an output connector 42 connected to the unidirectional bus 54 and used only for data output. Inputted in the input connector 41 is data DT2 sent from the module 30 through the unidirectional bus 53. This module 40 further comprises a switch 43 for switching between the unidirectional buses 53 and 54, a CPU 44 for providing controls over, for instance, data processing in the module itself, and a shared memory 45 allowing access not only from a CPU in the module but also from CPUs of other modules.

Figure 2:
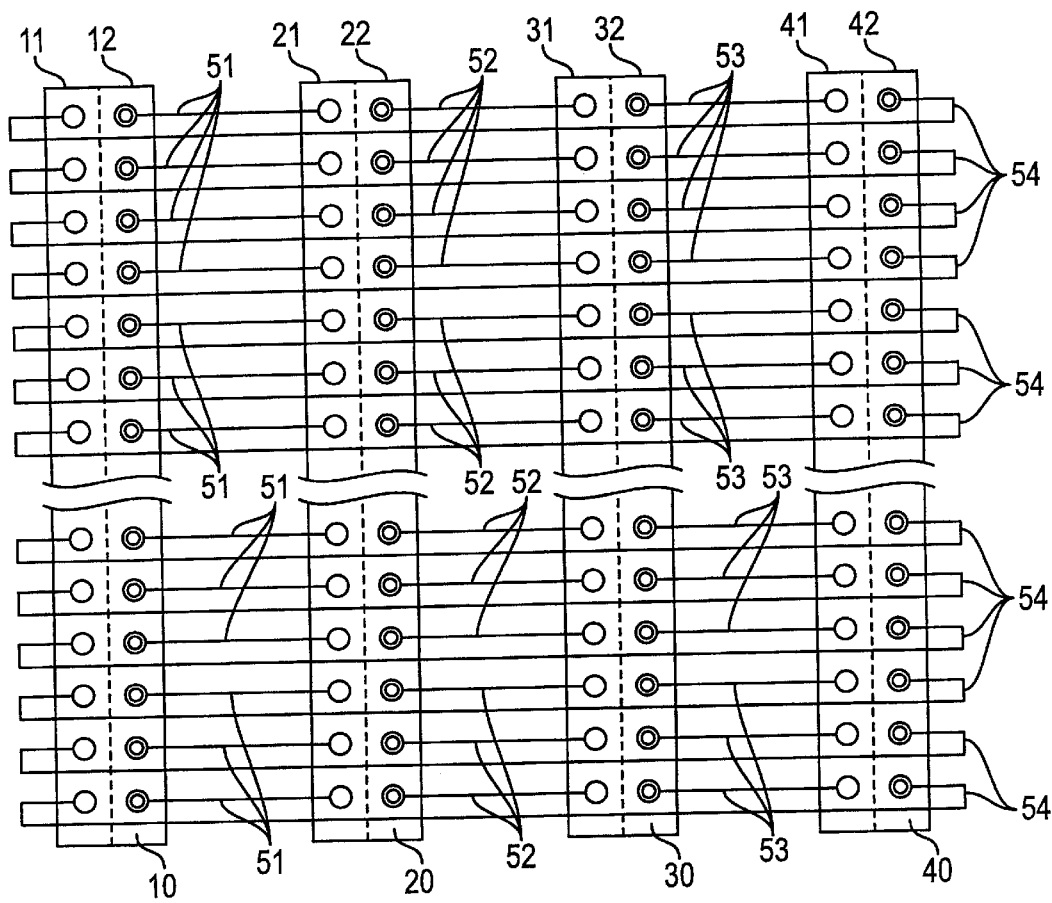
FIG. 2 is an appearance view showing a construction of connection between modules of the data processing apparatus shown in FIG. 1.

Next, description is made for a construction of connection between modules. FIG. 2 is an appearance view showing a construction of connection between modules of the data processing apparatus shown in FIG. 1. In FIG. 2, the input connectors 11, 21, 31 and 41 each have a plurality of input pins (indicated by a single circle) provided therein respectively, and the output connectors 12, 22, 32 and 42 each have a plurality of output pins (indicated by concentric circles) provided therein respectively.

Each of the output connectors 12, 22, 32 and 42 in the modules 10, 20, 30 and 40 is connected to an input connector in the adjoining module with a signal pattern on a back plane (or mother board). Each of the modules 10, 20, 30 and 40 has a mountable back plane respectively. As far as the back plane is concerned, the module 40 mounted on one end of the packaged slot has a signal pattern connected to the input connector 11 in the module 10 mounted on the opposite end with respect to the output connector 42.

Figure 3:
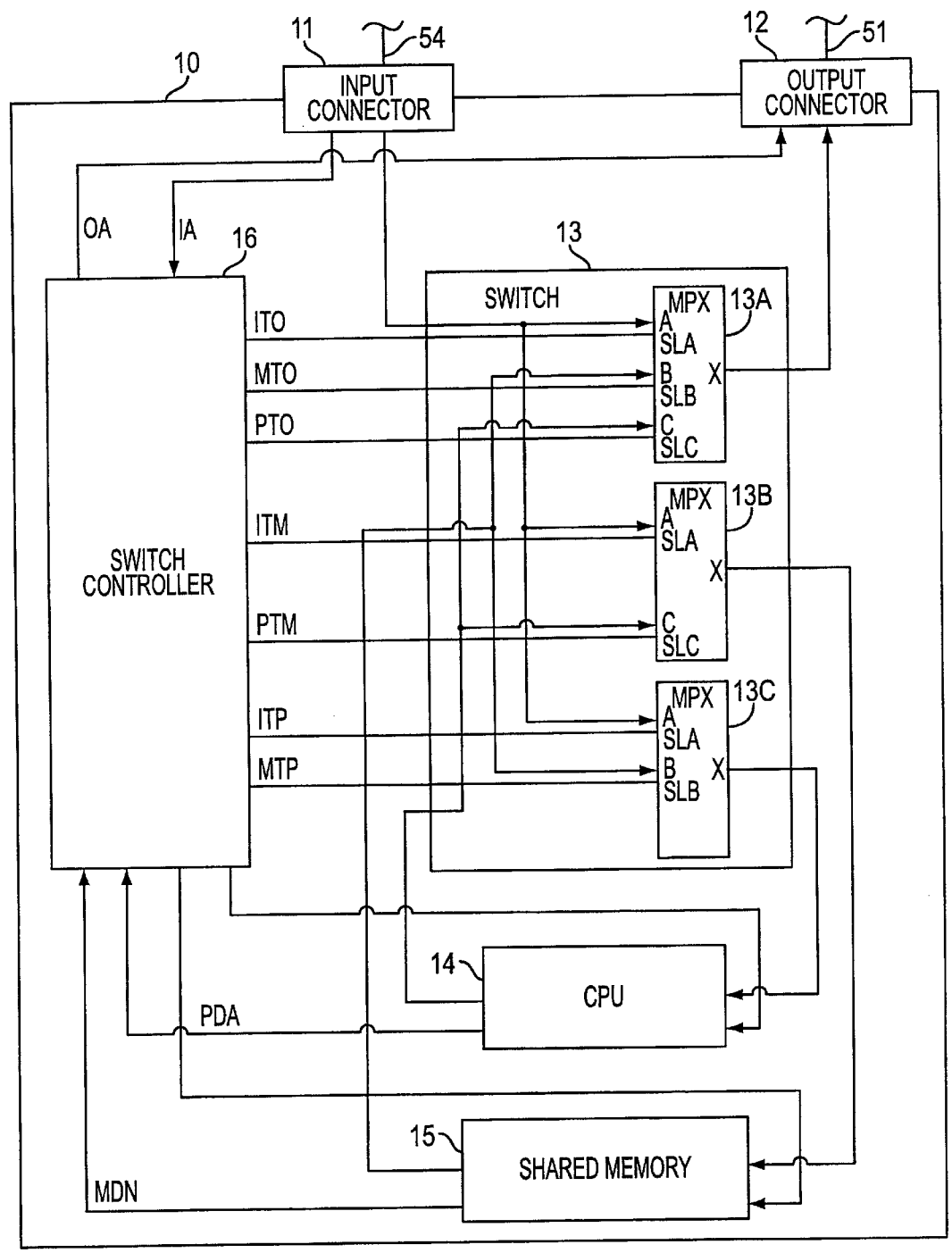
FIG. 3 is a block diagram showing representative internal configuration of a module in Embodiment 1.

Next, description is made for concrete configuration of the module. FIG. 3 is a block diagram showing representative internal configuration of the module in Embodiment 1. Module 10 is taken up herein as a representative of the module. This module 10 comprises, as shown in FIG. 3, an input connector 11, an output connector 12, a switch 13, a CPU 14, a shared memory 15, and a switch controller 16.

The input connector 11 is connected to the unidirectional bus 54 and receives data from the external module 40 as well as address information IA for the data through the unidirectional bus 54. This input connector 11 sends out the received address information IA to the switch controller 16, and outputs the received data to the switch 13 (multiplexers 13A, 13B and 13C described later). The address information IA is an information indicating the destination of the data received from the outside of the module 10 as well as information transmitted before transmission of the data.

The output connector 12 is connected to the unidirectional bus 51 and outputs data as well as address information OA for the data to the other module 20 through the unidirectional bus 51. This output connector 12 receives address information OA to be outputted from the switch controller 16 and also receives data to be outputted from the switch 13 (only multiplexer 13A described later). The address information OA is information indicating the destination for the data outputted to the outside of the module 10 as well as information transmitted before transmission of the data.

The switch 13 has three multiplexers 13A, 13B and 13C (indicated by MPX in the figure). The multiplexer 13A has select inputs SLA, SLB and SLC each connected to the switch controller 16, a data input A connected to the input connector 11, a data input B connected to the shared memory 15, a data input C connected to the CPU 14, and a data output X connected to the output connector 12. Namely, this multiplexer 13A forms a path for switching the data input A, B, or C to the data output X according to controls over switching (select input SLA, SLB, or SLC) provided by the switch controller 16.

Inputted in the select input SLA in this multiplexer 13A is a select signal ITO. This select signal ITO is a signal outputted from the switch controller 16, which indicates selection of a path through which data received from the input connector 11 is to be outputted to the output connector 12. Inputted in the select input SLB is a select signal MTO.

This select signal MTO is a signal outputted from the switch controller 16, which indicates selection of a path through which data read out from the shared memory 15 is outputted to the output connector 12. Then, inputted in the select input SLC is a select signal PTO. This select signal PTO is a signal outputted from the switch controller 16, which indicates selection of a path through which data read out from the CPU 14 is outputted to the output connector 12.

The multiplexer 13B has select inputs SLA and SLC each connected to the switch controller 16, a data input A connected to the input connector 11, a data input C connected to the CPU 14, and a data output X connected to the shared memory 15. Namely, this multiplexer 13B forms a path for switching the data input A or C to the data output X according to controls over switching (select input SLA or SLC) provided by the switch controller 16.

Inputted in the select input SLA in this multiplexer 13B is a select signal ITM. This select signal ITM is a signal outputted from the switch controller 16, which indicates selection of a path through which data received from the input connector 11 is outputted to the shared memory 15. Inputted in the select input SLC is a select signal PTM. This select signal PTM is a signal outputted from the switch controller 16, which indicates selection of a path through which data read out from the CPU 14 is outputted to the shared memory 15.

The multiplexer 13C has select inputs SLA and SLB each connected to the switch controller 16, a data input A connected to the input connector 11, a data input B connected to the shared memory 15, and a data output X connected to the CPU 14. Namely, this multiplexer 13C forms a path for switching the data input A or B to the data output X according to controls over switching (select input SLA or SLB) provided by the switch controller 16.

Inputted in the select input SLA in this multiplexer 13C is a select signal ITP. This select signal ITP is a signal outputted from the switch controller 16, which indicates selection of a path through which data received from the input connector 11 is outputted to the CPU 14. Inputted in the select input SLB is a select signal MTP. This select signal MTP is a signal outputted from the switch controller 16, which indicates selection of a path through which data read out from the shared memory 15 is outputted to the CPU 14.

The CPU 14 is connected to the switch 13 as well as to the switch controller 16, subjects data to data processing when the data is received from the multiplexer 13C in the switch 13, and outputs a result of the processing to the switch 13. The switch 13 executes switching for sending out the result of the processing to a particular destination of output through the multiplexer 13A or 13B under controls by the switch controller 16.

This CPU 14 also transmits, when data is to be transferred to other module, address information PDA for identifying an address of the destination for transfer to the switch controller 16. The switch controller 16 provides controls for transmitting address information OA to the output connector 12 before transmission of the data to be transferred according to the address information PDA.

The shared memory 15 connected to the switch 13 as well as to the switch controller 16, stores data therein, when the data is received from the multiplexer 13B in the switch 13, and reads out the stored data for transfer to output the data to the switch controller 16. The switch 13 executes switching for transmitting the stored data to a particular destination according to the an output of multiplexer 13A or 13C under controls by the switching controller 16.

This shared memory 15 also sends out, when data is to be transferred to an external module, address information MDN for identifying an address of the destination for transfer to the switch controller 16. The switch controller 16 provides controls for sending out address information OA to the output connector 12 before transmission of the data to be transferred according to the address information MDN.

The switch controller 16 provides controls for switching of the switch 13. The switch controller 16 is connected to the CPU 14 as well as to the shared memory 15, and provides controls for sending out address information OA to the output connector 12 before transmission of the data to be transferred according to the address information PDA sent from the CPU 14 as well as to the address information MDN sent from the shared memory 15. This switch controller 16 also sends a select signal for instructing selection of a path to each of the multiplexers 13A, 13B and 13C in the switch 13 as described above, and provides controls for switching the paths of the input data.

As this select signal, as described above, the signal ITO, MTO, or PTO is transmitted to the multiplexer 13A according to an object for switching, the signal ITM or PTM is transmitted to the multiplexer 13B according to an object for switching, and the signal ITP or MTP is transmitted to the multiplexer 13C according to an object for switching.

Next, description is made for a switching control method of the switch controller 16. FIG. 4 is a view for explaining switching control according to Embodiment 1. Allocated to each CPU and shared memory in each module are serial numbers of P and M respectively in Embodiment 1 similarly to the example based on the conventional technology. Namely, the reference numerals P0, P1, P2 and P3 are correlated to the CPU 14, 24, 34 and 44, and M0, M1, M2 and M3 are correlated to the shared memory 15, 25, 35 and 45, respectively.

Any of the select signals ITO, MTO, PTO, ITM, ITP and MTP varies according to conditions as to whether a destination No. section indicated by address information IA, a destination No. section indicated by address information PDA, and a destination No. section indicated by address information MDN coincide with the number of the CPU 14 or not, or coincide with the number of the shared memory 15 or not, or coincide with neither of the CPU nor the shared memory.

Concretely, concerning the destination No. section of the address information IA, when the number thereof indicates M0, the select signals ITO and ITP are set to "0", and the select signal ITM is set to "1". In this case, to store the data, data transfer from the input connector 11 to the shared memory 15 is instructed through the multiplexer 13B.

When the number thereof indicates P0, the select signals ITO and ITM are set to "0", and the select signal ITP is set to "1". In this case, for data processing, data transfer from the input connector 11 to the CPU 14 is instructed through the multiplexer 13C.

When the number thereof indicates neither M0 nor P0, the select signals ITM and ITP are set to "0", and the select signal ITO is set to "1". In this case, to transparently transfer input data, data transfer from the input connector 11 to the output connector 12 is instructed through the multiplexer 13A.

Then, concerning the destination No. section of the address information PDA, when the number thereof indicates M0, the select signal PT0 is set to "0", and the select signal PTM is set to "1". In this case, to store data, data transfer from the CPU 14 to the shared memory 15 is instructed through the multiplexer 13B.

When the number thereof does not indicate M0, the select signal PTM is set to "0", and the select signal PT0 is set to "1". In this case, to transmit data to other module, data transfer from the CPU 14 to the output connector 12 is instructed through the multiplexer 13B.

Then, concerning the destination No. section of the address information MDN, when the number thereof indicates P0, the select signal MT0 is set to "0", and the select signal MTP is set to "1". In this case, for data processing, data transfer from the shared memory 15 to the CPU 14 is instructed through the multiplexer 13B.

When the number thereof does not indicate P0, the select signal MTP is set to "0", and the select signal MT0 is set to "1". In this case, to transmit data to other module, data transfer from the shared memory 15 to the output connector 12 is instructed through the multiplexer 13B.

Next, description is made for formats of the address section and the data section. FIG. 5 is a view for explaining a format of address section in Embodiment 1, and FIG. 6 is a view for explaining a format of a data section in Embodiment 1.

The format of the address section comprises, as shown in FIGS. 5A to 5D, one byte (8 bits) per cycle. This address section has, as shown in FIG. 5A, a first cycle comprising a destination No. section, and thereafter and on, as shown in FIGS. 5B to 5D, a second to a fourth cycle constitute address information.

As the data section comprises 64 bytes in all, the data section is transferred by being divided into 4 cycles assuming that one cycle has 16 bytes. The data section is transmitted always after a delay of one cycle from the address section, and for this reason, the first cycle of the data section corresponds to the second cycle of the address section, which means one cycle is delayed than that of the address section. Each of the second to the fifth cycle of the data section comprises data information as shown in FIGS. 6A to 6D respectively.

As described above, the address section is transmitted earlier than the data section by one cycle during the first cycle to the fourth cycle, while the data section is transmitted after a delay of one cycle from the address section during the second cycle to the fifth cycle. The switch controller 16 can establish a path for the data section in the early stage by controlling this one cycle delay.

Figure 8:
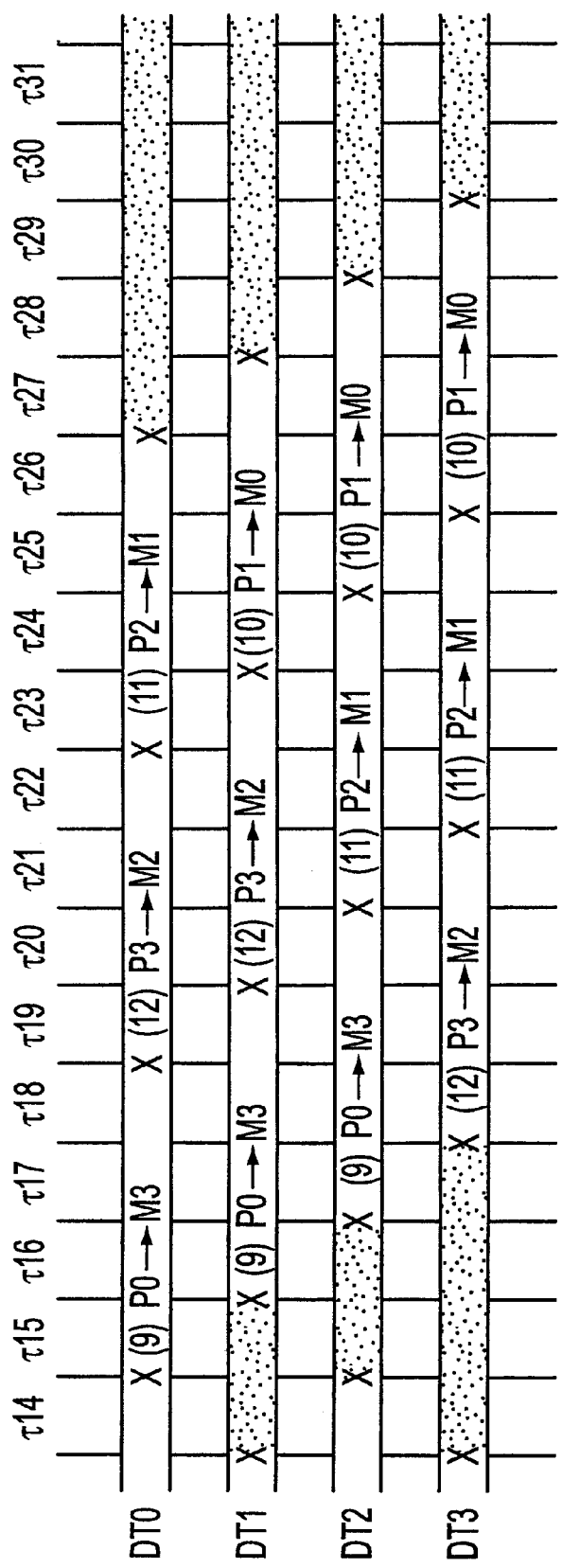
FIG. 8 is a time chart of one operation in Embodiment 1.
Figure 9A:
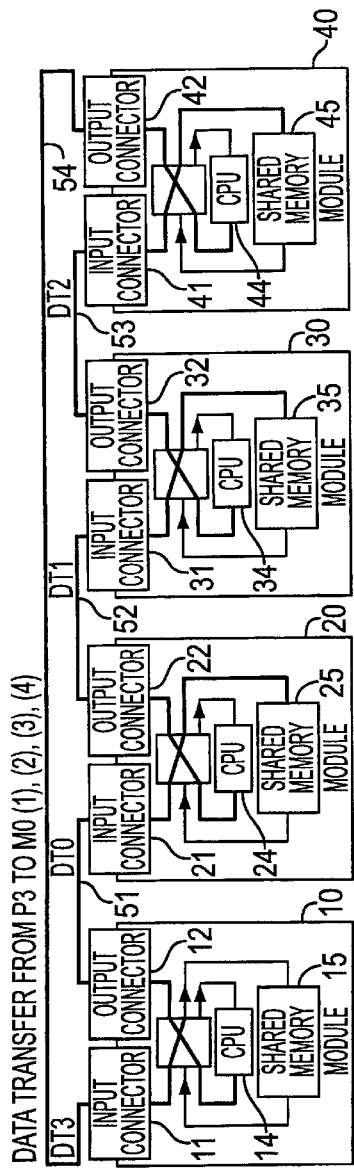
FIGS. 9A to 9C are views for explaining how a state of switching is changed in Embodiment 1.
Figure 9B:
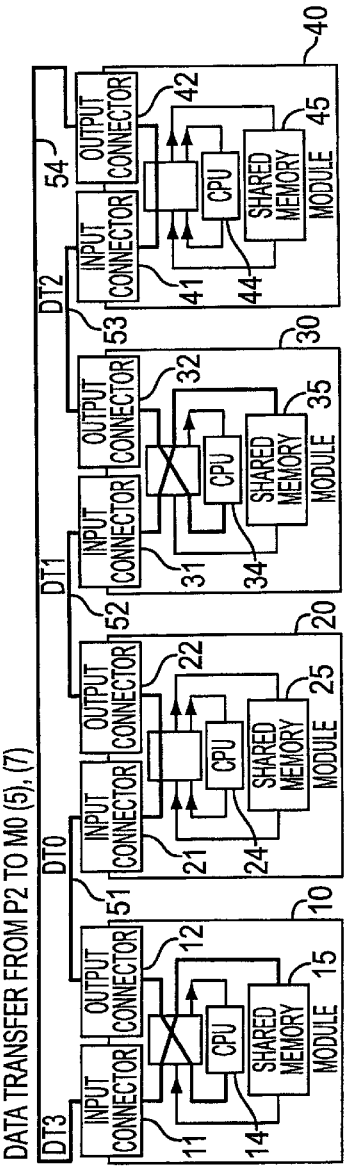
Figure 9C:
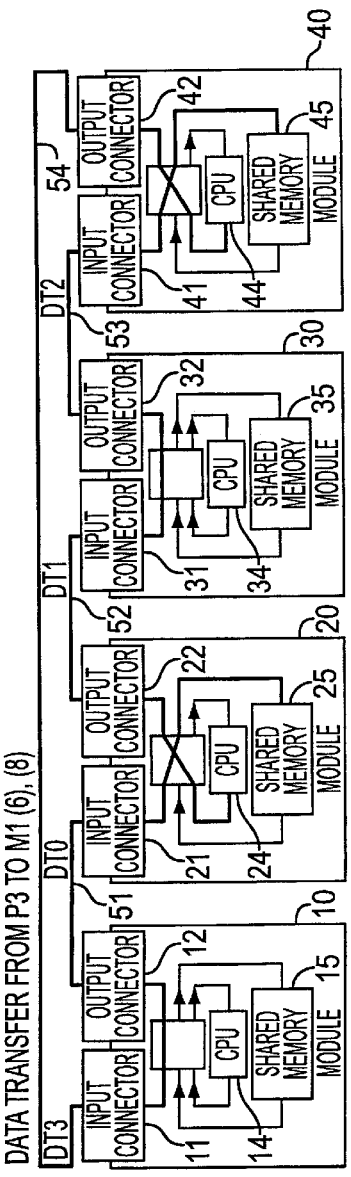
Figure 10A:
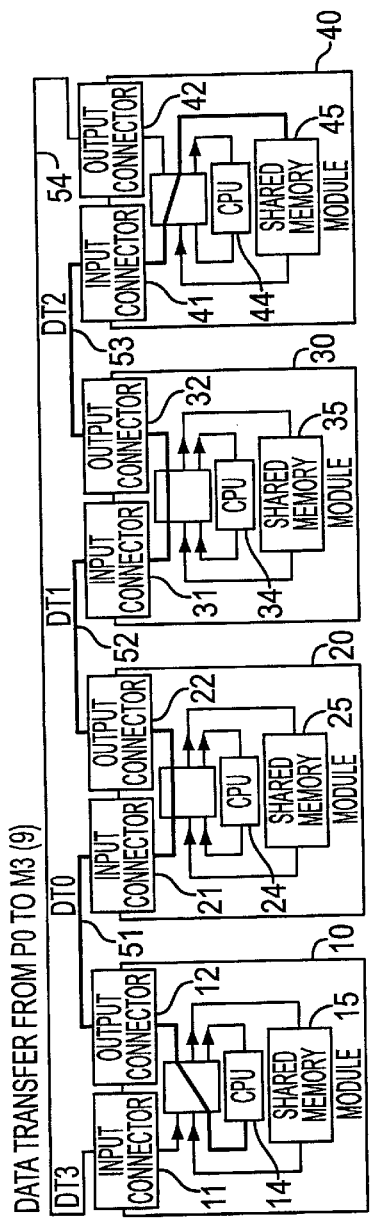
FIGS. 10A to 10C are views for explaining how a state of switching is changed in Embodiment 1.
Figure 10B:
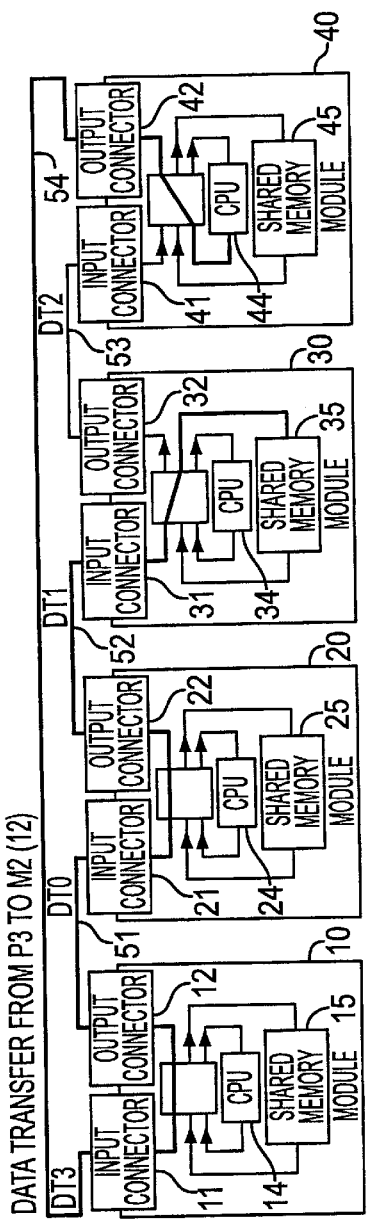
Figure 10C:
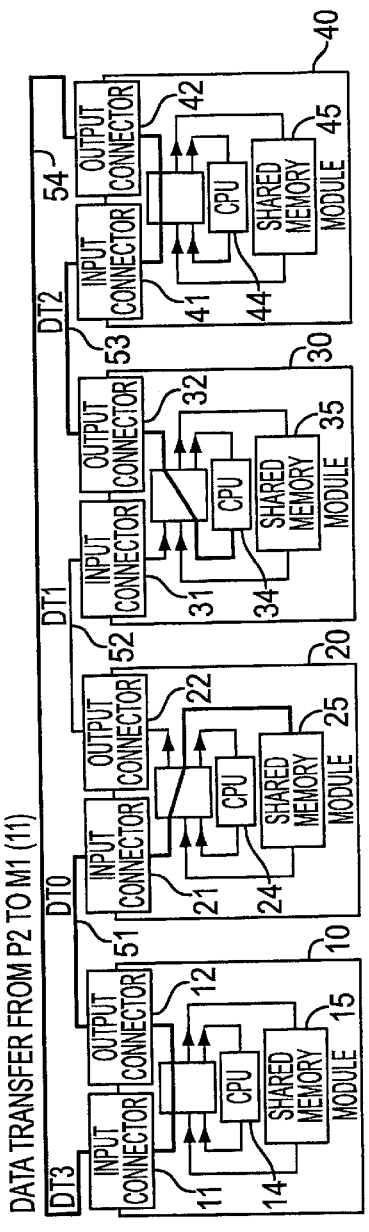
Figure 11:
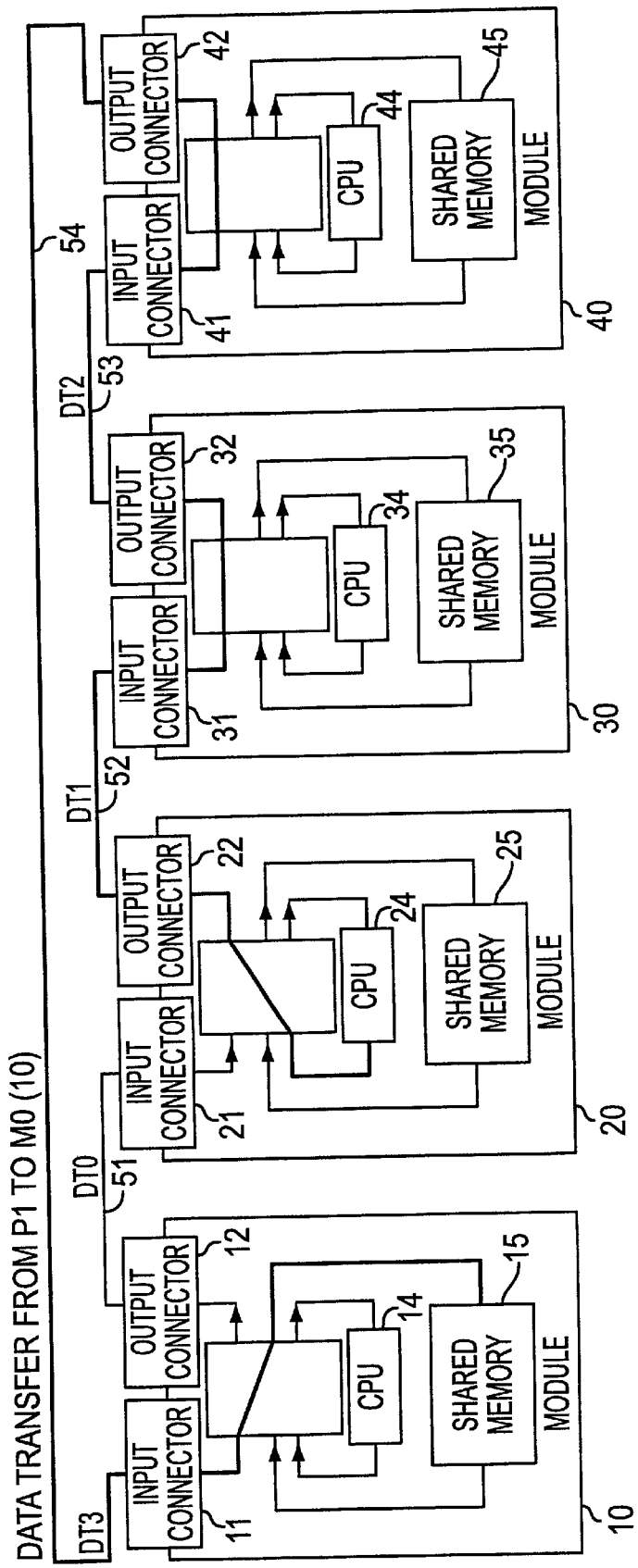
FIG. 11 is a view for explaining how a state of switching is changed in Embodiment 1.

Next, description is made for operations. FIG. 7 and FIG. 8 are time charts each of operation in Embodiment 1, and FIG. 9 to FIG. 11 are views each for explaining how a state of switching is changed in Embodiment 1.

Figure 24:
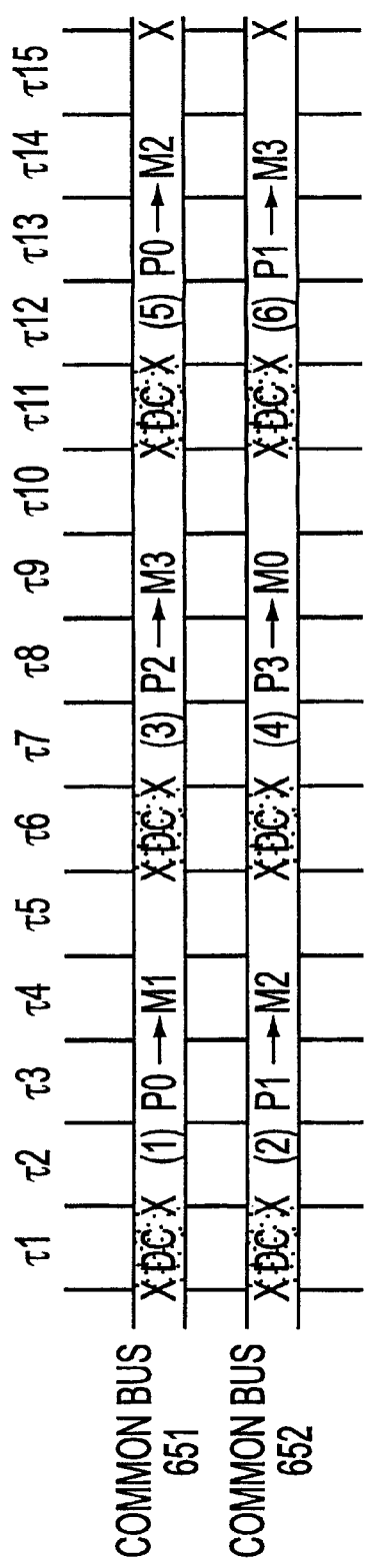
FIG. 24 is a time chart of operation according to the conventional technology.
Figure 25:
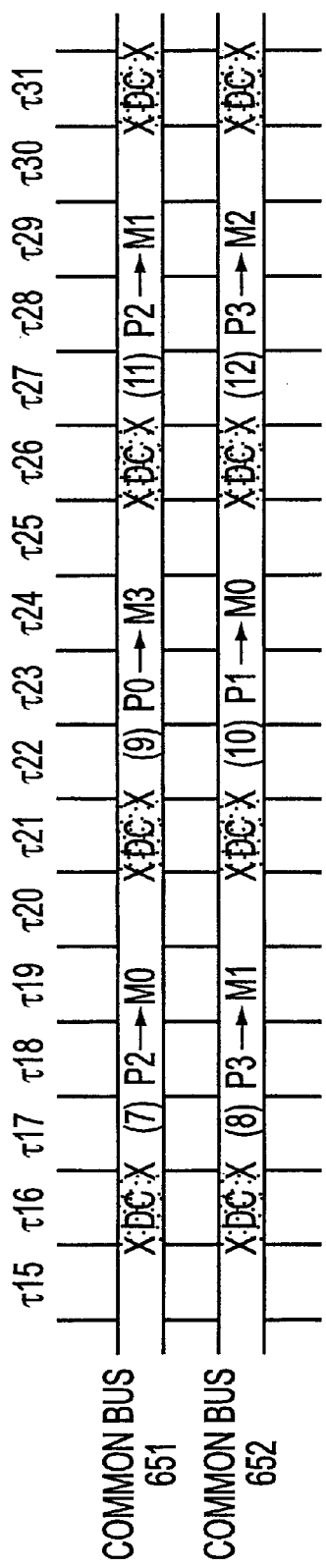
FIG. 25 is a time chart of an operation according to the conventional technology.

FIG. 7 and FIG. 8 show changes in data DT3, DT0, DT1 and DT2 inputted in the modules 10, 20, 30 and 40 each in a range from τ1 (first cycle) to τ29 (29th cycle) respectively. It should be noted that operational patterns in FIG. 7 and FIG. 8 show average movement similarly to those based on the conventional technology (refer to FIG. 24 and FIG. 25), but the movement in Embodiment 1 simultaneously proceeds, because of data transfer due to a unidirectional bus construction, over the four unidirectional buses 51, 52, 53 and 54.

For comparison with the conventional technology here, even in case of in FIG. 7 and FIG. 8, description assumes a case where all the accesses as follows are executed: (1) P0 to M1, (2) P1 to M2, (3) P2 to M3, (4) P3 to M0, (5) P0 to M2, (6) P1 to M3, (7) P2 to M0, (8) P3 to M1, (9) P0 to M3, (10) P1 to M0, (11) P2 to M1 and (12) P3 to M2. It should be noted that any of the accesses requires 4 cycles.

The data DT0 shows a signal pattern on a back plane connected from the output connector 12 in the module 10 to the input connector 21 in the module 20. The data DT1 shows a signal pattern on a back plane connected from the output connector 22 in the module 20 to the input connector 31 in the module 30.

The data DT2 shows a signal pattern on a back plane connected from the output connector 32 in the module 30 to the input connector 41 in the module 40. The data DT3 shows a signal pattern on a back plane connected from the output connector 42 in the module 40 to the input connector 11 in the module 10.

At first, during τ1 to τ4, (1) a signal pattern for accessing P0 to M1 is formed in the data DT0, and (2) a signal pattern for accessing P1 to M2 is formed in the data DT1. Also, during the same τ1 to τ4, (3) a signal pattern for accessing P2 to M3 is formed in the data DT2, and (4) a signal pattern for accessing P3 to M0 is formed in the data DT3.

During the above period, data transfer is executed from the CPU 14 in the module 10 to the shared memory 25 in the module 20, and are from the CPU 24 in the module 20 to the shared memory 35 in the module 30, from the CPU 34 in the module 30 to the shared memory 45 in the module 40, and from the CPU 44 in the module 40 to the shared memory 15 in the module 10. In these (1) to (4) transferring stages, data transfer to the next module is executed as described above (refer to FIG. 9A).

Then, during τ5 to τ8, (5) a signal pattern for accessing P0 to M2 is formed in the data DT0, and then (5) a signal pattern for accessing P0 to M2 is formed in the data DT1 during τ6 to τ9 after one empty cycle is inserted at τ5. With this feature, data transfer is executed from the CPU 14 in the module 10 to the shared memory 35 in the module 30 across the module 20 (refer to FIG. 9B).

Further, formed in this data DT1 is (6) a signal pattern for accessing P1 to M3 during τ10 to τ13, and in response to the formation, (6) a signal pattern for accessing P1 to M3 is formed in data DT2 during τ11 to τ14 after one cycle delay from the above cycle. It should be noted that empty time is generated in data DT2 between τ9 and τ10. With this feature, data transfer is executed from the CPU 24 in the module 20 to the shared memory 45 in the module 40 across the module 30 (Refer to FIG. 9C).

Also, formed in data DT2 during previous τ5 to τ8 is (7) a signal pattern for accessing P2 to M0, and in response to this, (7) a signal pattern for accessing P2 to M0 is formed in data DT3 during τ6 to τ9 after a delay of one cycle from the above cycle. It should be noted that empty time is generated in data DT3 at τ5. With this feature, data transfer is executed from the CPU 34 in the module 30 to the shared memory 15 in the module 10 across the module 40 (refer to FIG. 9B).

Then, formed in data DT3 during τ10 to τ13 is (8) a signal pattern for accessing P3 to M1, and in response to this, (8) a signal pattern for accessing P3 to M1 is formed in data DT0 during τ11 to τ14 after a delay of one cycle from the above cycle. It should be noted that an empty time is generated in data DT0 between τ9 and τ10. With this feature, data transfer is executed from the CPU 44 in the module 40 to the shared memory 25 in the module 20 across the module 10 (refer to FIG. 9C).

Then, formed in data DT0 during τ15 to τ18 is (9) a signal pattern for accessing P0 to M3, and in response to this, (9)

a signal pattern for accessing P0 to M3 is formed in the data DT1 (during τ16 to τ19) after a delay of one cycle from the above cycle, and in the data DT2 (during τ17 to τ20) after further one cycle delay from that of data DT1.

It should be noted that empty time is generated in data DT1 between τ14 and τ15 and empty time is generated in data DT2 between τ15 and τ16. With this feature, data transfer is executed from the CPU 14 in the module 10 to the shared memory 45 in the module 40 across two modules, namely the modules 20 and 30 (refer to FIG. 10A).

Then, formed in data DT3 during τ18 to τ21 is (12) a signal pattern for accessing P3 to M2, and in response to this, (12) a signal pattern for accessing P3 to M2 is formed in the data DT0 (during τ19 to τ22) after a delay of one cycle from the above cycle, and in the data DT1 (during τ20 to τ23) after further one cycle delay from that of data DT0.

It should be noted that an empty time is generated in data DT3 during τ14 to τ17. With this feature, data transfer is executed from the CPU 44 in the module 40 to the shared memory 35 in the module 30 across two modules, namely the modules 10 and 20 (refer to Fig. 10B).

Then, formed in data DT2 during τ21 to τ24 is (11) a signal pattern for accessing P2 to M1, and in response to this, (11) a signal pattern for accessing P2 to M1 is formed in the data DT3 (during τ22 to τ25) after a delay of one cycle from the above cycle, and in the data DT0 (during τ23 to τ26) after further one cycle delay from that of data DT3.

With this feature, data transfer is executed from the CPU 34 in the module 30 to the shared memory 25 in the module 20 across two modules, namely the modules 40 and 10. Then, a transfer cycle of the unidirectional bus 51 for transferring data DT0 therethrough is ended (refer to FIG. 10C).

Then, formed in data DT1 during τ24 to τ27 is (10) a signal pattern for accessing P1 to M0, and in response to this, (10) a signal pattern for accessing P1 to M0 is formed in the data DT2 (during τ25 to τ28) after a delay of one cycle from the above cycle, and in the data DT3 (during τ26 to τ29) after further delay of one cycle from that of data DT2.

With this feature, data transfer is executed from the CPU 24 in the module 20 to the shared memory 15 in the module 10 across two modules, namely the modules 30 and 40. Then, each transfer cycle of the unidirectional buses 52, 53 and 54 for transferring data DT1, DT2 and DT3 therethrough respectively is ended one cycle by one cycle (refer to FIG. 11).

As described above, during τ1 to τ4, each transfer from (1) to (4) is simultaneously executed, and during τ5 to τ9, each transfer of (5) and (7) are simultaneously executed. Further, there is provided a unidirectional bus in which a direction of transfer is always one direction, that is different from the common bus structure based on the conventional technology, and for this reason, bus fight is eliminated. With this feature, it is not necessary to provide an empty cycle of 1τ for each 4τ. It should be noted that a time required for data to pass through a module is 1τ.

The data transfer capability in the conventional type of apparatus is 2.1 GB/s assuming that a bus width is 16 bytes×2 systems. To compare the value to that based on the conventional technology, in Embodiment 1, each data width of the input connectors 11, 21, 31 and 41 as well as of the output connectors 12, 22, 32 and 42 in each module is set to 16 bytes respectively. Accordingly, 64-byte transfer is possible with 4τ.

When accesses from (1) to (12) are performed in Embodiment 1, as shown in FIG. 7 and FIG. 8, a time required for end of all data transfer is averaged as follows, wherein data DT0, DT1, DT2 and DT3 have 26τ, 27τ, 28τ and 29τ, respectively:

$$(26\tau+27\tau+28\tau+29\tau)/4=27.5\tau$$

Then, the data transfer capability in this case is obtained as follows:

$$64 \text{ bytes} \times 12 \text{ times}/27.5\tau \times 12 \text{ ns} = 2.33 \text{ GB/s}$$

and for this reason, it is clear that the capability here is improved as compared to 2.1 GB/s as in case of the conventional technology.

Figure 23:
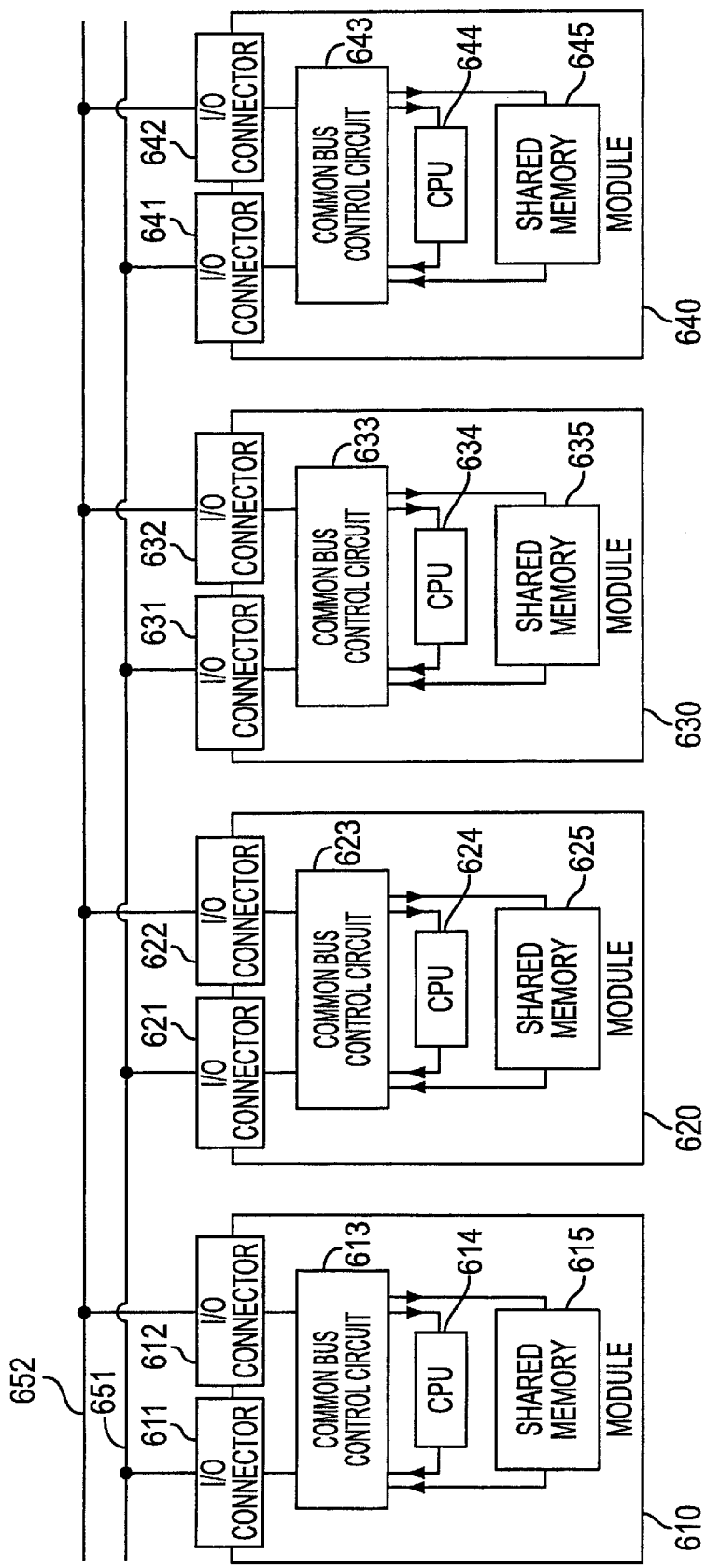
FIG. 23 is a block diagram showing a data processing apparatus based on the conventional technology.

Further, connection between modules is realized one to one in the single direction, so that a total line length is shorter as compared to a case where all the modules are connected to each other like in the common buses 651 and 652 (refer to FIG. 23) as in the conventional technology, which makes the capacity of input load on each module smaller. Accordingly, a delay time for transfer between modules can remarkably be reduced, and, for instance, it is easily possible to realize reduction as far as 10 ns or less while 1τ=12 ns in the bus system.

This effect is more significant when a larger number of modules are connected to each other, and if the effect is less estimated in Embodiment 1 considering 1τ=10 ns, the data transfer capability is obtained as follows:

$$64 \text{ bytes} \times 12 \text{ times}/27.5\tau \times 10 \text{ ns} = 2.79 \text{ GB/s}$$

and for this reason, it is clear that the capability here is remarkably improved as compared to that based on the conventional technology.

Figure 12:
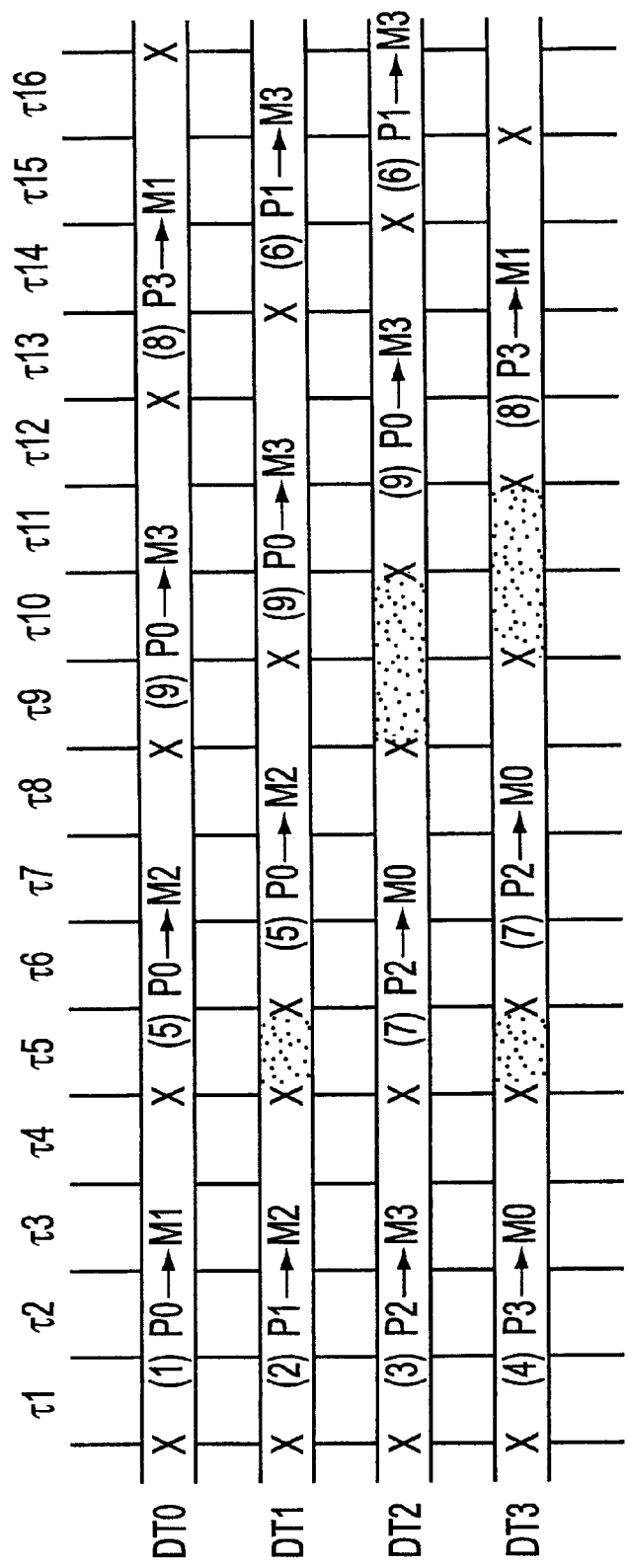
FIG. 12 is a time chart of other operation in Embodiment 1.
Figure 13:
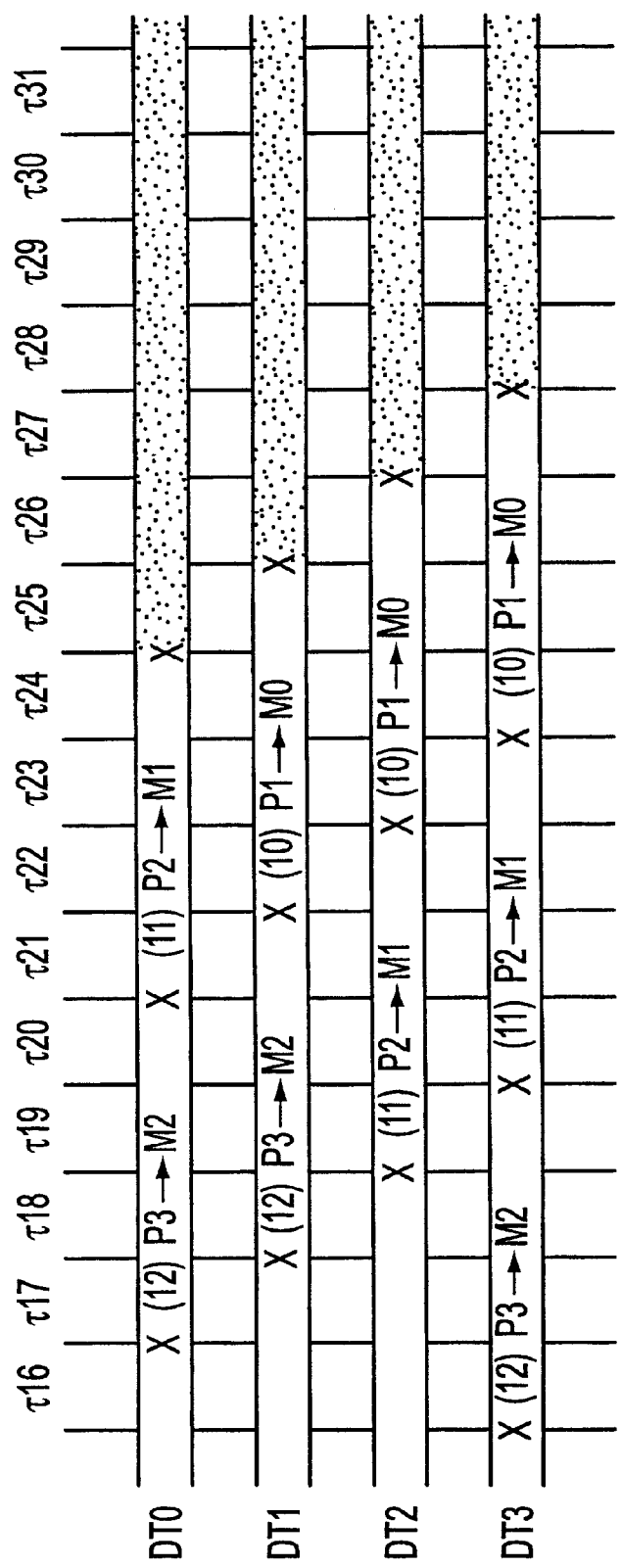
FIG. 13 is a time chart of other operation in Embodiment 1.

Next, description is made for other example of operations. FIG. 12 and FIG. 13 are time charts of other operation in Embodiment 1. The time charts in FIG. 12 and FIG. 13 are examples showing that the configuration in FIG. 7 and FIG. 8 can more efficiently transfer data by means of transfer in a different order. Description is made hereinafter for a portion of a difference in the order.

As it is clear from FIG. 7 and FIG. 8 that transfer of data (9) can be executed at τ9, and hence, the transfer of data (9) is preferentially executed. Thereafter and on, transfer is successively executed from the data which is ready to be transferred, and for this reason, all of the transfer can be ended as a whole more quickly than in the case of transfer in FIG. 7 and FIG. 8. Namely, after the access to the data (9), accesses to data (6) and (8) are simultaneously executed.

The above operations are averaged as follows:

$$(24\tau+25\tau+26\tau+27\tau)/4 = 25.5\tau$$

Accordingly, the data transfer capability in this case is obtained as follows:

$$64 \text{ bytes} \times 12 \text{ times}/25.5\tau \times 12 \text{ ns} = 2.51 \text{ GB/s}$$

Further, assuming that 1τ=10 ns, the following expression is obtained:

$$64 \text{ bytes} \times 12 \text{ times}/25.5\tau \times 10 \text{ ns} = 3.12 \text{ GB/s}$$

and for this reason, it is possible to obtain significantly upgraded data transfer capability.

As described above, with Embodiment 1, in module junction with unidirectional data transfer, transfer control is simultaneously provided in one direction for inputted data from an external module through an input connector as well as for data from a CPU or a shared memory according to each destination for transfer, so that the data transfer capability is improved even with low cost configuration, and with this feature it is possible to upgrade performance of a system as a whole.

In the switch controller, a destination for transfer is determined according to address information correlated to data to be transferred, so that complicated processing is not required inside the module, and with this feature transfer control can easily be realized.

Data inputted from an external module through an input connector and data from an internal CPU or a shared memory are simultaneously switched to a destination for transfer using address information in a switch, so that there is no conflict between data, and with this feature transfer control can smoothly be realized.

Before data is transmitted, address information correlated to the data is transmitted, so that it is possible to establish a path for data before transmission of the data. Further, connection is made to an adjoining module through a bus, and for this reason when data is successively transferred between data processing modules, data transfer can simultaneously be controlled in each data processing module without generating bus fight.

In Embodiment 1 described above, a line length of a unidirectional bus for connection between an output connector 42 of the module 40 and an input connector 11 of the module 10 is longer as compared to line lengths between other modules. For this reason, a cycle of 1τ is inserted as a delay time between the output connector 42 and input connector 11.

Namely, the transfer path with this unidirectional bus 54 becomes a critical path. For this reason, like in Embodiment 2 described below, to eliminate an extreme difference in line length, a line length of a bus for which longest time is required may be distributed to other buses so that connection patterns between modules will not be long.

Figure 14:
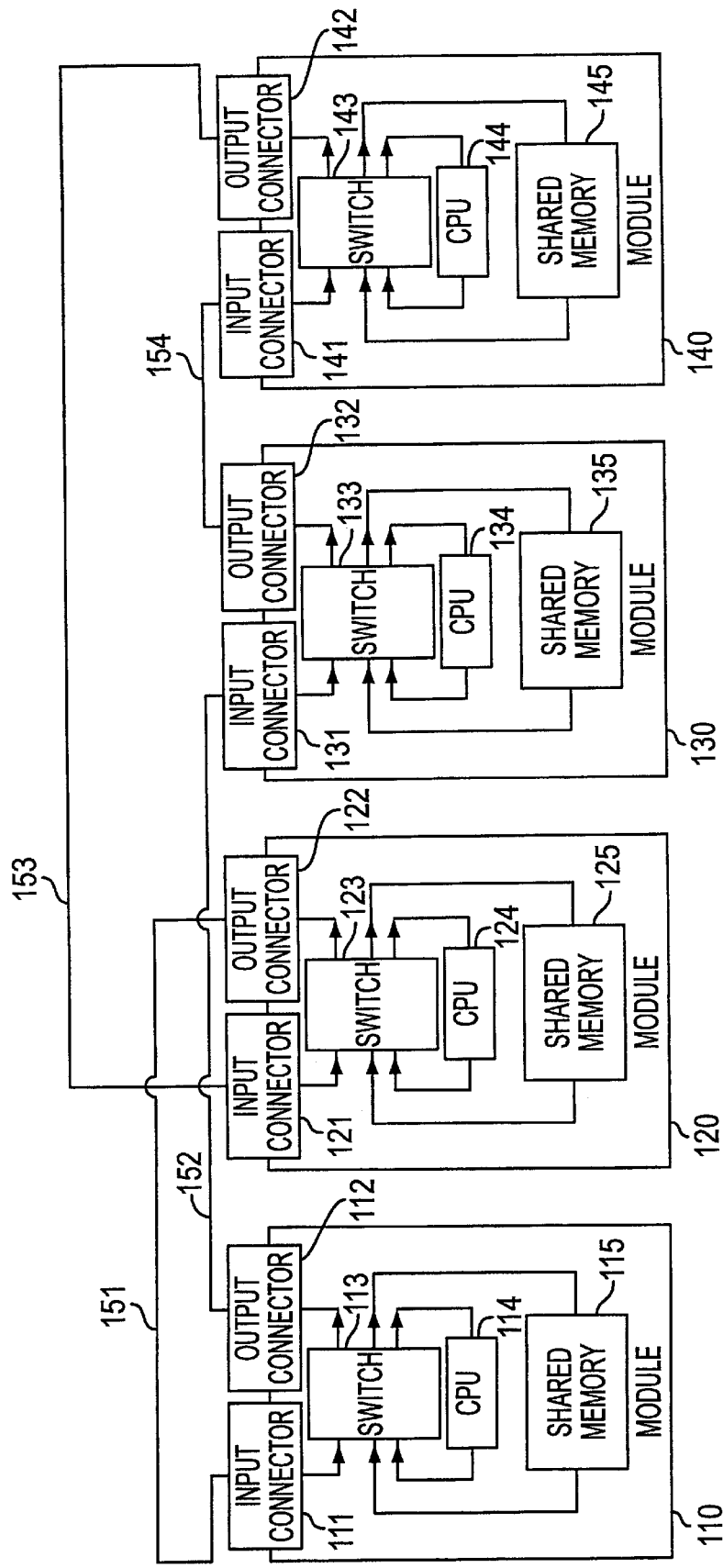
FIG. 14 is a block diagram showing a data processing apparatus according to Embodiment 2 of the present invention.

At first description is made for the configuration. FIG. 14 is a block diagram showing a data processing apparatus according to Embodiment 2 of the present invention. In FIG. 14, the reference numerals 110, 120, 130, 140 indicate modules respectively, and the reference numerals 151, 152, 153, 154 indicates unidirectional buses between the modules 110 and 112, between the modules 110 and 130, between the modules 120, and between the modules 130 and 140, respectively.

The module 110 has an input connector 111 connected to a unidirectional bus 151 and used only for data input, and an output connector 112 connected to a unidirectional bus 152 and used only for data output. Data sent via the unidirectional bus 151 from the module 120 is inputted into the input connector 111.

This module 110 further includes a switch 113 for switching between the unidirectional buses 151 and 152, a CPU 114 for controlling data processing in the module or other related processing, and a shared memory 115 allowing access not only from a CPU in the module but also from CPUs of other modules. In addition, although not shown in the figure, like in Embodiment 1 described above, a switch controller having the same function is provided.

The module 120 has an input connector 121 connected to a unidirectional bus 153 and used only for data input, and an output connector 122 connected to the unidirectional bus 151 and used only for data output. Data sent via the unidirectional bus 153 from the module 140 is inputted into the input connector 121.

This module 120 further has a switch 123 for switching between the unidirectional buses 151 and 153, a CPU 124 for controlling data processing in the module or other related processing, and a shared memory 125 allowing access not only from a CPU in the module but also from CPUs of other modules. It should be noted that, although not shown in the figure, like in Embodiment 1 described above, a switch controller having the same function is provided therein.

The module 130 has an input connector 131 connected to the unidirectional bus 152 and used only for data input, and an output connector 132 connected to a unidirectional bus 154 and used only for data output. Data sent via the unidirectional bus 152 from the module 110 is inputted into the input connector 131.

This module 130 further includes a switch 133 for switching between the unidirectional buses 152 and 154, a CPU 134 for controlling the data processing in the module or other related processing, and a shared memory allowing access not only from a CPU in the module, but also from CPUs of other modules. It should be noted that, although not shown in the figure, like in Embodiment 1 described above, a switch controller having the same function is provided therein.

The module 140 has an input connector 141 connected to a unidirectional bus 154 and used only for data input, and an output connector 142 connected to the unidirectional bus 153 and used only for data output. Data sent via the unidirectional bus 154 from the module 130 is inputted into the input connector 141.

This module 140 further includes a switch 143 for controlling bus switching between the unidirectional buses 153 and 154, a CPU 144 for controlling data processing in the module or other related processing, and a shared memory 145 allowing access not only from a CPU in the module, but also from CPUs of other modules. It should be noted that, although not shown, like in Embodiment 1 described above, a switch controller having the same function is provided therein.

The difference in operations of the data processing apparatus according to Embodiment 2 from those of the data processing apparatus according to Embodiment 1 is due to the control over data transfer generated from a difference in connection between unidirectional buses. It should be noted that the switching control is provided by a switch controller according to address information like in Embodiment 1.

In Embodiment 1, 1τ is required for data transfer to an adjoining module, but in Embodiment 2, 3τ is required for data transfer from P0 to M1, 2τ for data transfer from P1 to M2, 1τ for data transfer from P2 to M3, and 2τ from data transfer from P3 to M0. For this reason, as 1τ is required on an average for data transfer to an adjoining module, a time longer by 4τ is required in Embodiment 2.

In Embodiment 1, 2τ is required for data transfer to a module which is two modules ahead, but in Embodiment 2, 1τ is required for data transfer from P0 to M2, 3τ for data transfer from P1 to M3, 3τ for data transfer from P2 to M0, and 1τ for data transfer from P3 to M1. For this reason, when data is transferred to a module which is two modules ahead, as 2τ is required on an average in Embodiment 1, the same time is required in Embodiment 1.

When data is transferred to a module which is three modules ahead, 3τ is required in Embodiment 1 described above, but in Embodiment 2, 2τ is required for data transfer from P0 to M3, 1τ for data transfer from P1 to M0, 2τ for data transfer from P2 to M1, and 3τ for data transfer from P3 to M2. For this reason, when data is transferred to a module which is three modules ahead, as 3τ is required on an average in Embodiment 1, a timer shorter by 4τ is required in Embodiment 2.

Accordingly, also in Embodiment 2, a period of time actually required for data transfer is 24τ in all, so that the time is shorter as compared to that in the conventional technology. Further, in Embodiment 2, by distributing a line length between modules, an extreme difference in a line length like that in Embodiment 1 is eliminated, and a delay between modules can be suppressed to the minimum level.

Also in this Embodiment 2, output connectors for all modules are connected to input connectors of other modules respectively on a back plane pattern in a one to one form.

As described above, with Embodiment 2, it is needless to say that the effects as those achieved in Embodiment 1 can be achieved, and by distributing a line length between modules, an extreme line length like that in Embodiment 1 is eliminated, and a delay in data transfer between modules can be suppressed to the minimum level. With this feature, a period of time required for data transfer can be shortened.

In Embodiment 1 described above, data transfer is realized by means of connection between modules, so that, unless all the required modules are packaged, arbitrary data transfer between all the modules can not be realized. So, in order to adapt to a small scale system not requiring all the modules, a data processing apparatus operated with a small number of modules may be realized in Embodiment 3 of the present invention as described below.

In the small scale system as described above, to realize at least normal operations, it is required to provide a module having simple configuration. The module is described as dummy module hereinafter. This dummy module is not required to have all the module configuration shown in FIG. 3, but is required to have at least a function for transmissively transferring data. Namely, a low-cost and small-scale system can be formed by providing a module having the module configuration as shown in FIG. 3 to realize data transfer according to this invention and a required minimum number of dummy modules for realizing he data transfer therein.

Figure 15:
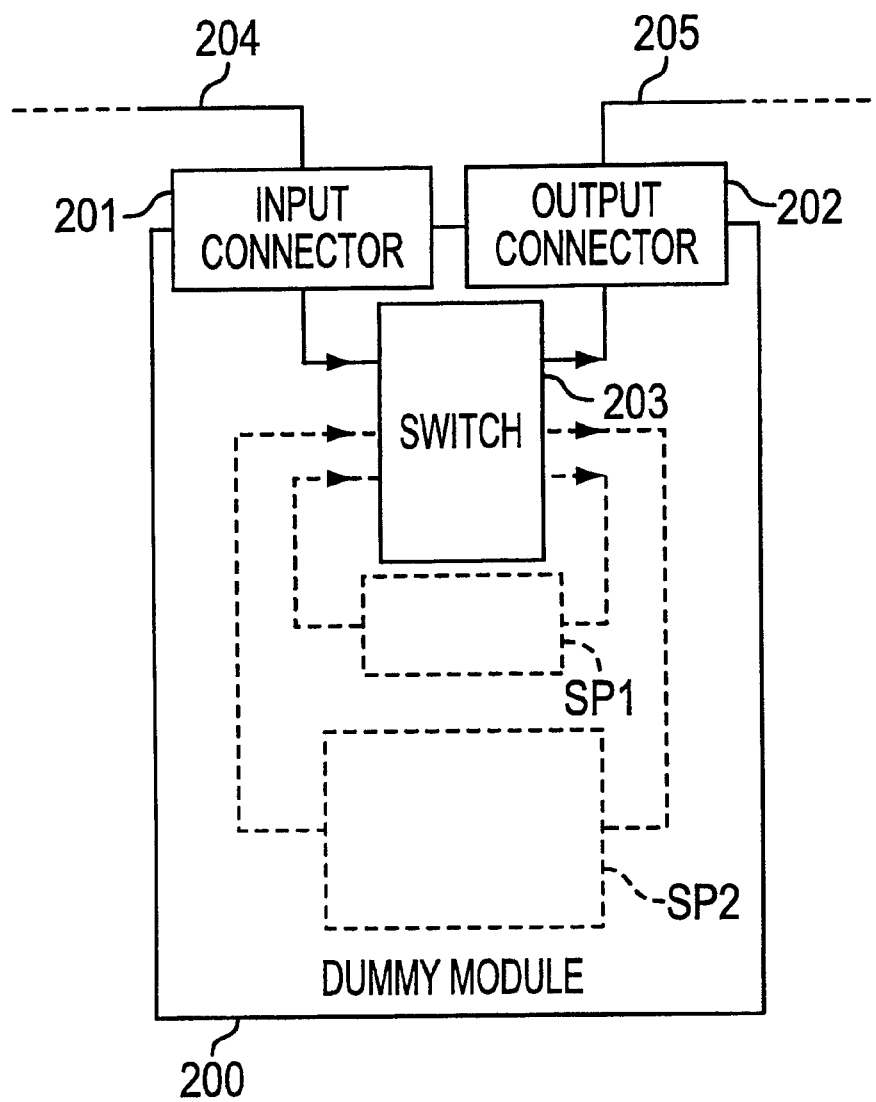
FIG. 15 is a block diagram showing key sections of a data processing apparatus according to Embodiment 3 of the present invention.

Next, description is made for the dummy module. It should be noted that the regular modules are the same as those in Embodiment 1 described above and description thereof is omitted herein. FIG. 15 is a block diagram showing a dummy module used in the data processing apparatus according to Embodiment 3 of the present invention, and in this figure, the reference numeral 200 indicates a dummy module.

In the dummy module 200, as shown in FIG. 15 a CPU and a shared memory to be packaged in a space SP1 and SP2 respectively are omitted. Thus, the dummy module 200 comprises, for instance, an input connector 201 connected to a unidirectional bus 204 with an output connector of an other module connected thereto, an output connector 202 connected to a unidirectional bus 205 with an input connector of an other module connected thereto, and a switch 203. It should be noted that, in addition, although not shown herein, a switch controller having the same function is provided in Embodiment 1 described above.

As for operations of the dummy module 200, as switching control for input and output over the CPU and shared memory is not required to be performed by the switch 203, only switching control form the input connector 201 to the output connector 202 is executed according to address information. It should be noted that the switching control is executed by the switch controller according to address information like in Embodiment 1.

As described above, with Embodiment 3, a dummy module not having a CPU nor a shared memory is included in a plurality of modules, so that a module used only for data transfer can be incorporated in the system. With this feature, arbitrary data transfer between all modules adapted to a small scale system can be realized. It should be noted that also a dummy module not having either one of a CPU or a shared memory can achieve the same effects.

In Embodiments 1 to 3 described above, each module has one input connector and one output connector respectively, so that a direction of data transfer is limited to one direction, but like in Embodiment 4 described above, data transfer in a direction reverse to that of the regular direction is executed to shorten a time required for data transfer.

Figures 16, 17:
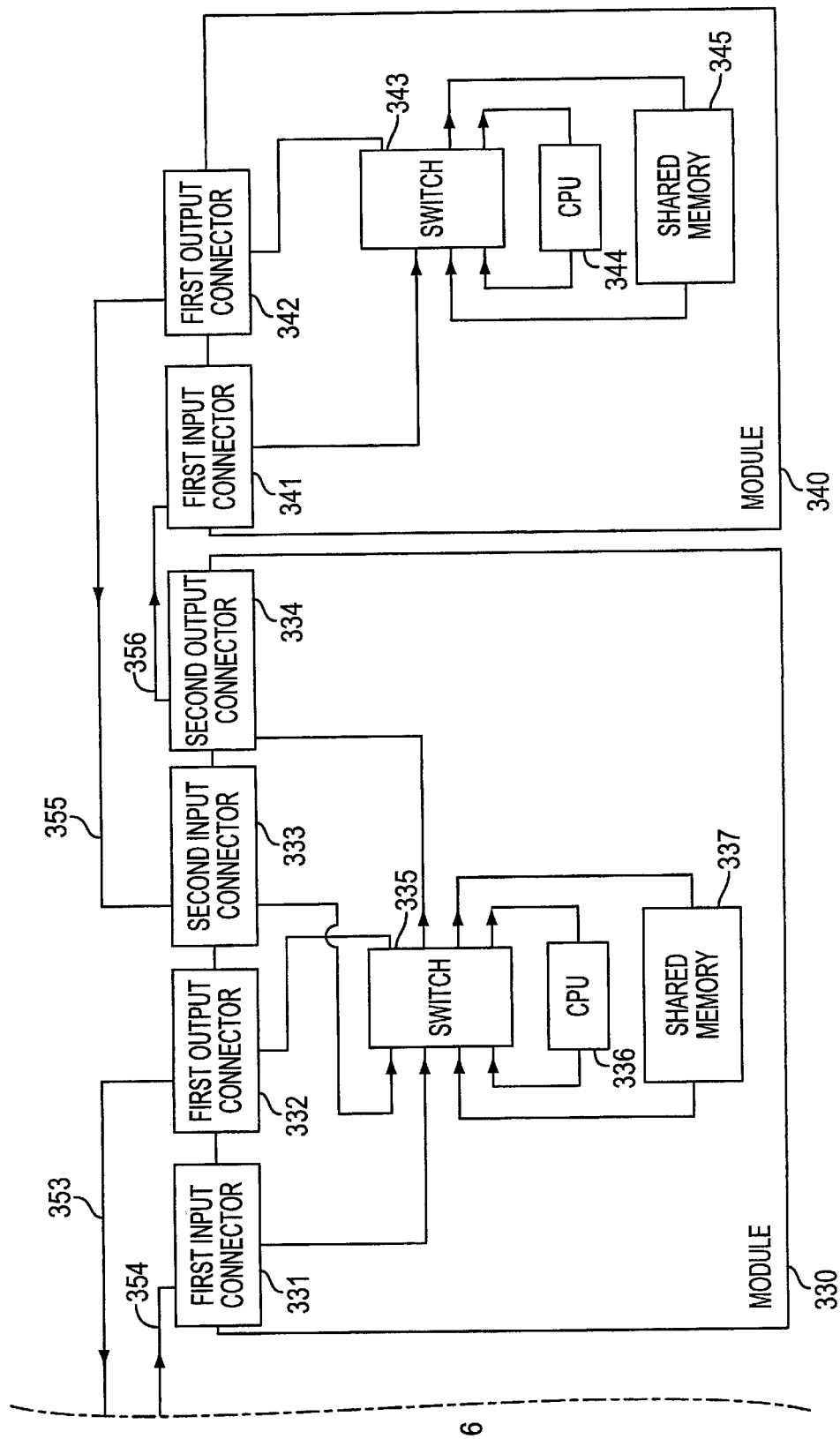
FIG. 16 is a block diagram showing a part of the data processing apparatus according to Embodiment 4 of the present invention.
FIG. 17 is a block diagram showing the remaining part of data processing apparatus according to Embodiment 4 of the present invention.

At first, description is made for the configuration. FIG. 16 and FIG. 17 are block diagrams each showing a data processing apparatus according to Embodiment 4 of the present invention. In FIG. 16 and FIG. 17, the reference numerals 310, 320, 330, and 340 indicate modules respectively, while the reference numerals 351, 352 indicate unidirectional buses for connection between the modules 310 and 320; the reference numerals 353, 354 indicates those for connection between the modules 320 and 330, and the reference numerals 355, 356 indicates those for connection between the modules 330 and 340.

The module 310 has a first input connector 311 connected to the unidirectional bus 351 and used only for data input, and a first output connector 312 connected to the unidirectional bus 352 and used only for data output. Data sent via the unidirectional bus 351 from the adjoining module 320 is inputted into the first input connector 311.

This module 310 further includes a switch 313 for switching between the unidirectional buses 351 and 352, a CPU 314 for controlling data processing in the module or related processing, and a shared memory 315 allowing access not only from a CPU in the module but also from CPUs of other modules.

The module 320 has a first input connector 321 connected to a unidirectional bus 352 and used only for data input, a first output connector 322 connected to a unidirectional bus 351 and used only for data output, a second input connector 323 connected to a unidirectional bus 353 and used only for data input, and a second output connector 324 connected to a unidirectional bus 354 and used only for data output. Data sent via the unidirectional bus 352 from the module 310 is inputted into the first input connector 321, and data sent via the unidirectional bus 353 from the module 330 is inputted into the second input connector 323.

This module 320 has a switch 325 for switching between the unidirectional buses 351 to 354, a CPU 326 for controlling data processing in the module or other related processing, and a shared memory 327 allowing access not only from a CPU in the module but also from CPUs of other modules.

The module 330 has a first input connector 331 connected to a unidirectional bus 354 and used only for data input, a first output connector 332 connected to a unidirectional bus 353 and used only for data output, a second input connector 333 connected to a unidirectional bus 355 and used only for data input, and a second output connector 334 connected to a unidirectional bus 356 and used only for data output.

Data sent via the unidirectional bus 354 from the module 320 is inputted to the first input connector 331, and data sent via the unidirectional bus 355 from the module 340 is inputted to the second input connector 333.

This module 330 has a switch 335 for switching between unidirectional bus 353 to 356, a CPU 336 for controlling data processing in the module or other related processing, and a shared memory 337 allowing access not only from a CPU in the module but also from CPUs of other modules.

The module 340 has a first input connector 341 connected to a unidirectional bus 356 and used only for data input, and a first output connector 342 connected to a unidirectional bus 355 and used only for data output. Data sent via the unidirectional bus 356 from an adjoining module 330 is inputted to the first input connector 341.

The module 340 has a switch 343 for switching between unidirectional buses 355 and 356, a CPU 344 for controlling data processing in the module and other related processing, and a shared memory 345 allowing access not only from a CPU in the module but also from CPUs of other modules.

With the configuration, as for data input, the difference from Embodiment 1 described above consists in the configuration allowing two-directional data transfer by the two modules 320, 330 of the 4 modules 310, 320, 330, and 340. In other words, in the module 320, input data from the module 310 is received by the first input connector 321, and input data from the module 330 is received by the second connector 323.

As for data output, output data to the module 310 is sent from the first output connector 322, and output data to the module 330 is sent from the second output connector 324.

Similarly, in the module 330, as for data input, input data from the module 320 is received by the first input connector 331, and input data from the module 340 is received by the second input connector 333. Also as for data output, output data to the module 320 is sent from the first output connector 332, and output data to the module 340 is sent from the second output connector 334.

As described above, in the modules 320 and 330, there is no restriction over the direction of data transfer, so that transferred data can be delivered to an adjoining module in either direction with 1 cycle (1τ), and to a module two ones ahead with 2 cycles (2τ).

In the modules 310 and 340 at both ends, as any of two modules 320 and 330 therebetween has a function for two-directional transfer, if either one of the modules 310 and 340 becomes a transmitter, a cycle time in proportion to a number of modules existing in the transfer direction is required. Switching control is executed, like in Embodiment 1, by a switch controller like in Embodiment 1.

As described above, with this Embodiment 4, it is needless to say that the same effects as those in Embodiment 1 can be obtained, and in a case of module junction for two-directional data transfer, transfer control is provided so that data inputted from other module and data from a CPU or a shared memory in a system are in two-directional mode transferred according to each destination for transfer, so that the data transfer performance in this Embodiment can substantially be improved as compared to unidirectional data transfer like that in Embodiment 1. With this feature, performance of the system as a whole can further be improved.

Also as a plurality of modules are serially connected to each other with a bus, and a transfer direction is reversed at a module at each end, so that a line length of a bus between modules can be kept at a minimum value. With this feature, a line path requiring an extremely long transfer time between modules is eliminated, so that a period of time required for data transfer can be shortened.

In Embodiment 4 described above, a capability for two-directional data transfer is given to modules serially connected to each other excluding those existing at both ends, but like in Embodiment 5 described below, a unidirectional bus may be provided between the modules at both ends so that a time required for data transfer between modules physically far from each other, namely between modules at both ends is shortened.

Figure 18:
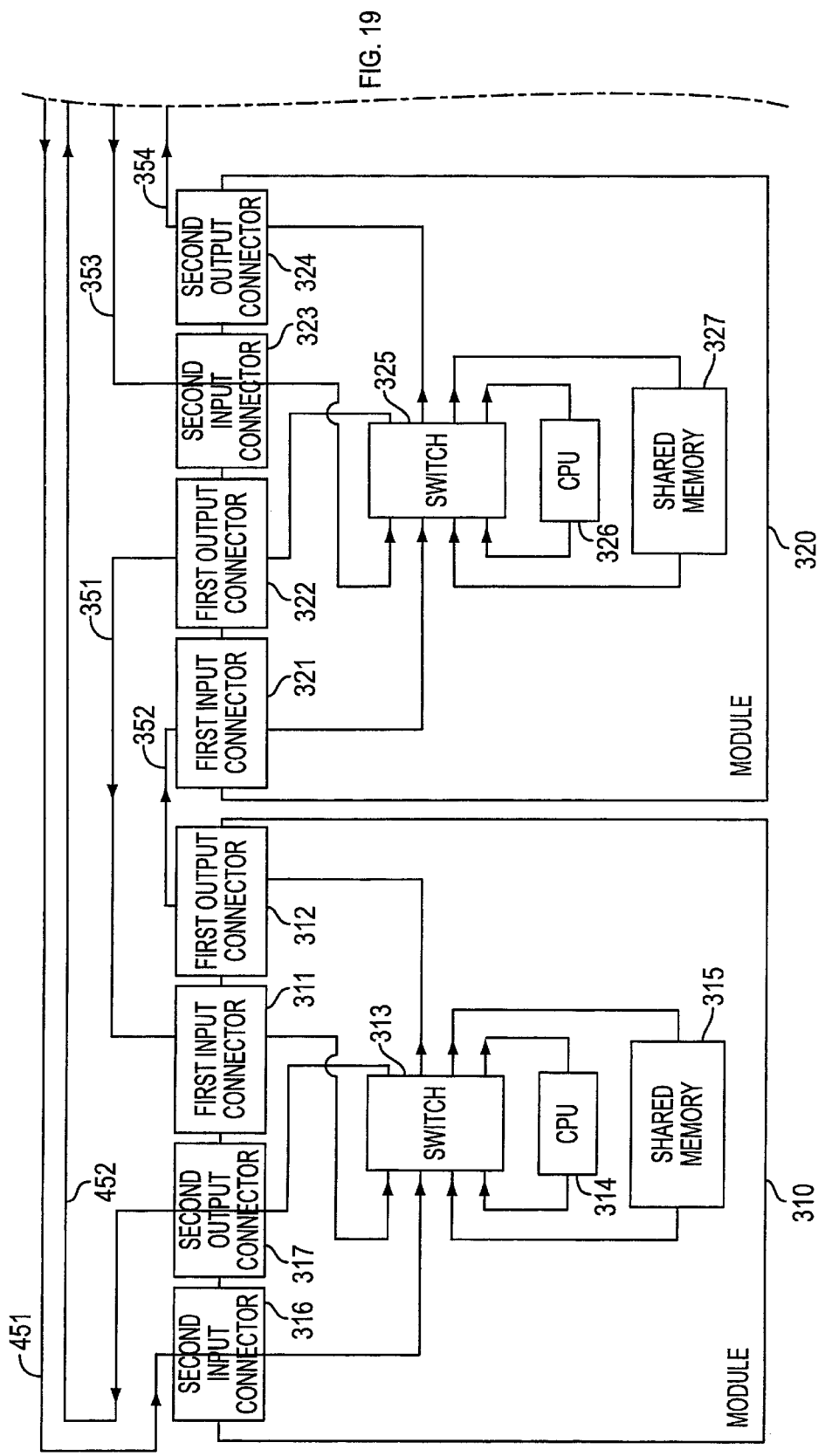
FIG. 18 is a block diagram showing a part of data processing apparatus according to Embodiment 5 of the present invention.
Figure 19:
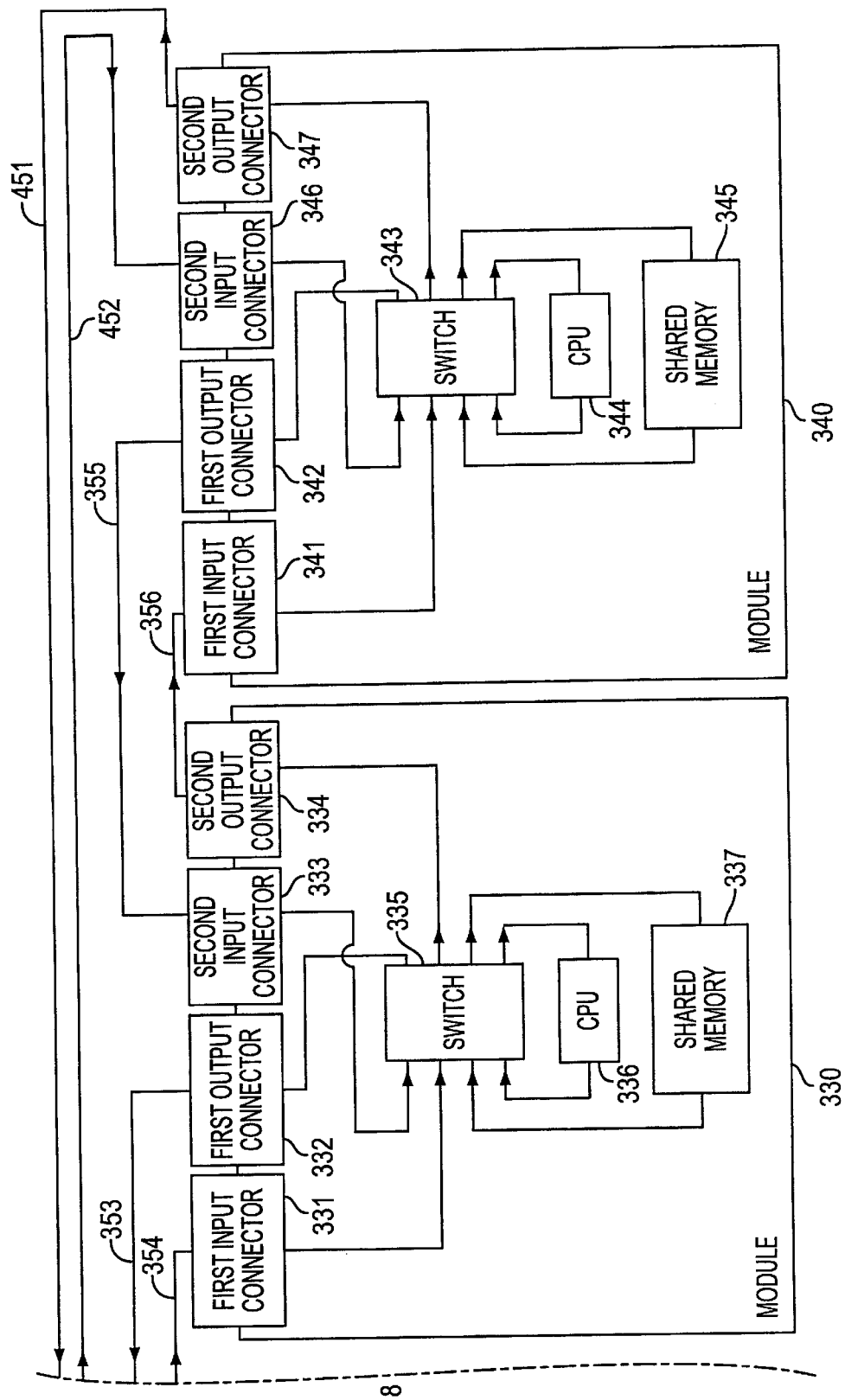
FIG. 19 is a block diagram showing the remaining part of data processing apparatus according to Embodiment 5 of the present invention.

This Embodiment 5 can be realized by employing the configuration according to Embodiment 4 described above. So description is made hereinafter only for different portions between the two embodiments. FIG. 18 and FIG. 19 are block diagrams each showing a data processing apparatus according to Embodiment 5 of the present invention. In FIG. 18 and FIG. 19, internal configuration of each of the modules 310, 320, 330, and 340 is the same as that in Embodiment 4.

However, between the modules 310 and 340 at both ends, a new unidirectional bus is directly provided. For this reason, another pair of second input connector 316 and second output connector 317 is provided in the module 310. Also another pair of second input connector 346 and second output connector 347 is provided in the module 340.

The second input connector 316 in the module 310 and the second output connector 347 in the module 340 are connected to each other with a unidirectional bus 451. With this configuration, direct data transfer from the module 340 to the module 310 becomes possible, and the cycle time becomes 1τ.

Further another unidirectional bus is connected between the modules 310 and 340 so that data can be transferred in two-directional mode. Namely, the second output connector 317 in the module 310 and the second connector 346 in the module 340 are connected to each other with a unidirectional bus 452.

As described above, by providing unidirectional buses 451, 452 also between the modules 310 and 340 for realization of two-directional data transfer, it becomes possible to substantially shorten a time required for data transfer between the modules 310 and 340 at both edges from 3τ in Embodiment 4 to 1τ in this embodiment. As a result, it is possible to realize efficient data transfer providing the effects provided in Embodiment 4 also. It should be noted that switching control is executed according to address information like in Embodiment 1.

As described above, with this Embodiment 5, a plurality of modules are connected with buses in a circular form, so that, different from a case where modules are serially connected with buses, a time required for data transfer between modules at both edges can substantially be shortened.

In Embodiment 5 described above, a line length between the modules 310 and 340 at both edges is extremely longer as compared to those between other modules, but like in Embodiment 6 described hereinafter, the maximum line length may be distributed to other buses so that a connected pattern between modules will not become long.

Figure 20:
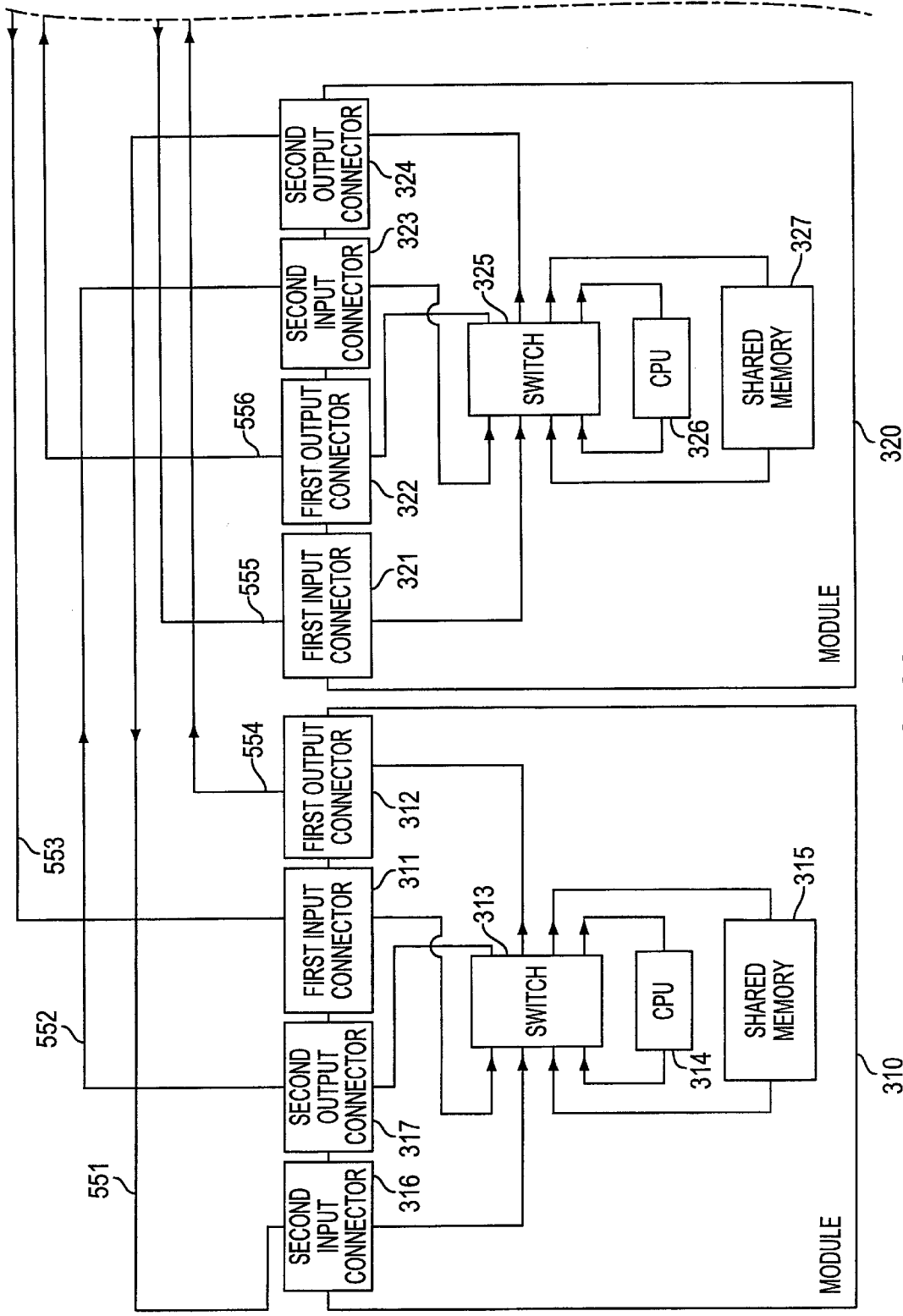
FIG. 20 is a block diagram showing a part of data processing apparatus according to Embodiment 6 of the present invention.
Figure 21:
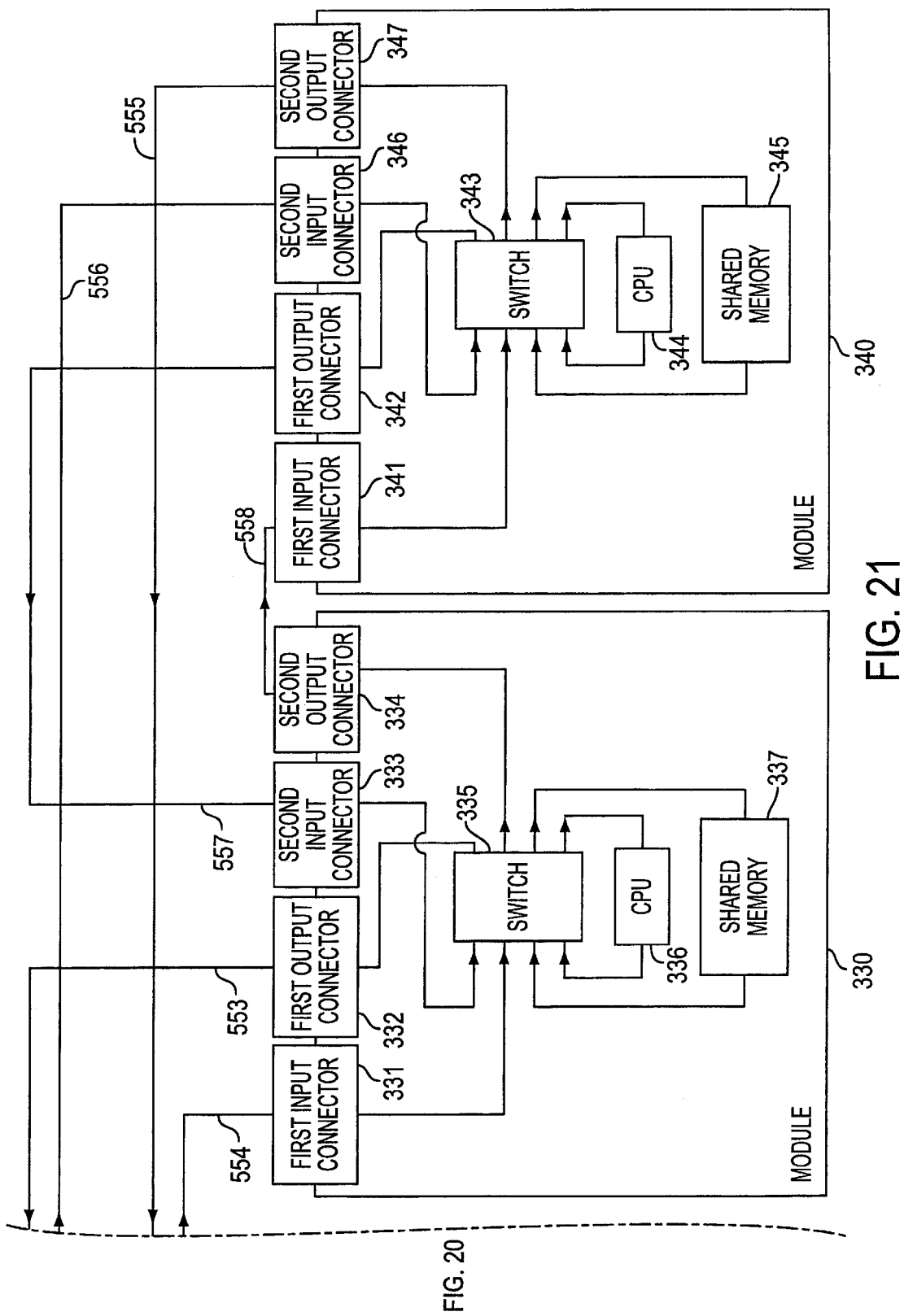
FIG. 21 is a block diagram showing the remaining part of data processing apparatus according to Embodiment 6 of the present invention.

This Embodiment 6 of the present invention can be realized by using the configuration according to Embodiment 5 described above. So, description is made hereinafter only for different portions. FIG. 20 and FIG. 21 are block diagrams each showing a data processing apparatus according to Embodiment 6 of the present invention. In FIG. 20 and FIG. 21, the internal configuration of each of the modules 310, 320, 330, and 340 is the same as that in Embodiment 4 as well as in Embodiment 5 described above.

Herein, however, bus connection is provided so that the line length becomes as short as possible. Namely, the second input connector 316 in the module 310 is connected to the second output connector 324 in the module 320 with a unidirectional bus 551, and the second output connector 317 in the module 310 is connected to the second input connector 323 in the module 320 with a unidirectional bus 552.

The first input connector 311 in the module 310 is connected to the first output connector 332 in the module 330 with a unidirectional bus 553, and the first output connector 312 is connected to the first input connector 331 in the module 330 with a unidirectional bus 554.

Further, the first input connector 321 in the module 320 is connected to the second output connector 347 in the module 340 with a unidirectional bus 555, and the first output connector 322 in the module 320 is connected to the second input connector 346 in the module 340 with a unidirectional bus 556.

Also the second input connector 333 in the module 330 is connected to the second output connector 342 in the module 340 with a unidirectional bus 557, and the second output connector 334 in the module 330 is connected to the first input connector 341 in the module 340 with a unidirectional bus 558.

A difference in operations from the data processing apparatus according to Embodiment 5 consists in data transfer generated by difference in connection of unidirectional buses, and with this feature, a time required for data transfer can be shortened by eliminating a unidirectional bus having an extremely long line length.

A relation between this Embodiment 6 and Embodiment 5 is the same as that between Embodiment 2 described above and Embodiment 1 in the point of shortening of a time required for data transfer by distributing a line length, excluding the point of two-directional data transfer. It should be noted that switching control is executed, like in Embodiment 1, by a switch controller according to address information.

As described above, with Embodiment 6, at least one module connected to a module which is two modules ahead with a bus is included in a plurality of modules, so that, when a destination for transfer is a module which is two modules ahead, data can be delivered thereto by skipping data processing modules existing therebetween. With this feature, it is possible to shorten a time required for data transfer.

In Embodiments 4 to 6 described above, data transfer is realized with connection between modules, so that arbitrary data transfer through all the modules can not be realized when some of modules have not been packaged. So, to adapt the data processing apparatus to a small scale system not requiring all of the modules, a data processing apparatus operating with a small number of modules may be realized like in Embodiment 7 described above.

In the small scale system described above, at least to realize normal operations, it is necessary to provide a module with simple configuration. The module is described hereinafter as dummy module. This dummy module is not required to have all of the modules shown in FIG. 3, but is required to have at least a function for transmissively transfer data. In other words, by providing a module having the module configuration shown in FIG. 3 to realize data transfer according to the present invention and a required minimum number of data transfer for realization of the data transfer, a low-cost small scale system can be built.

Figure 22:
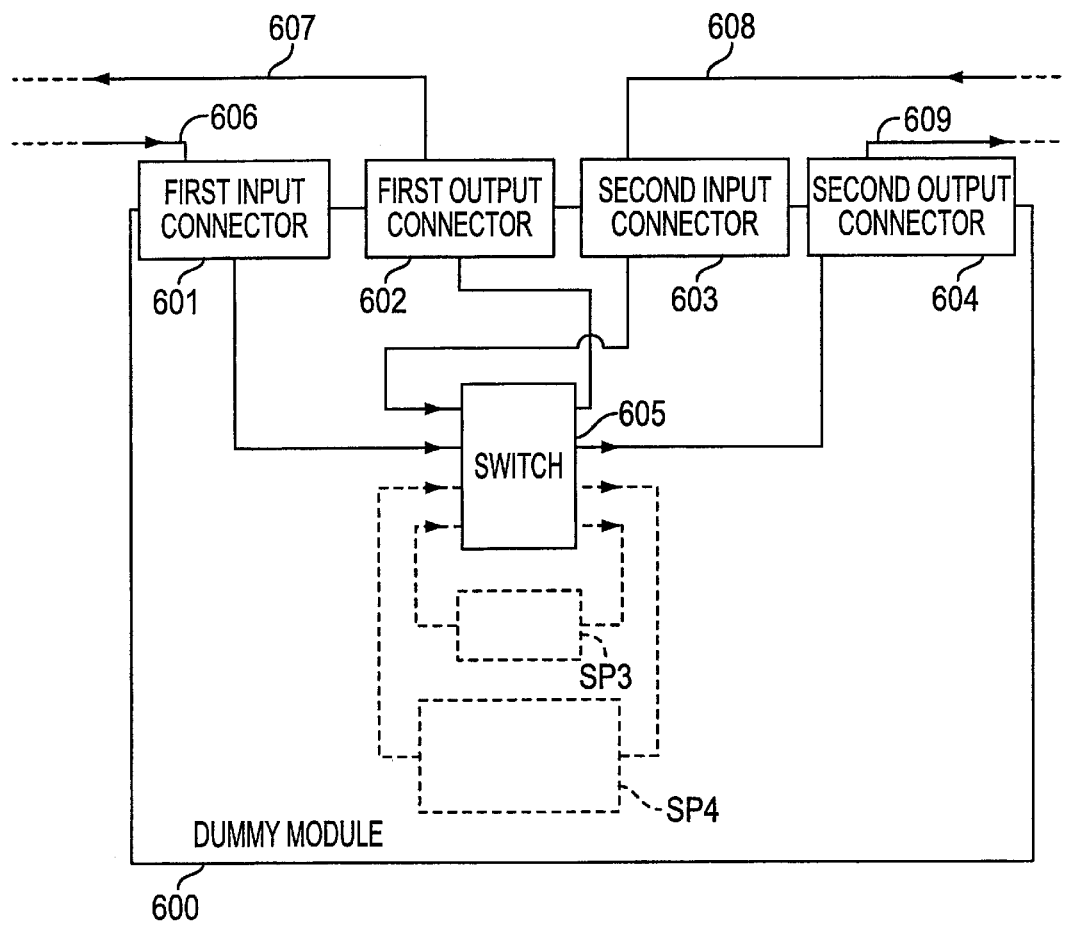
FIG. 22 is a block diagram showing key sections of a data processing apparatus according to Embodiment 7 of the present invention.

Next, description is made for a dummy module. It is assumed herein that the regular modules are the same as those in Embodiments 4 to 6, and for this reason description thereof is omitted herein. FIG. 22 is a block diagram showing a dummy module used in a data processing apparatus according to Embodiment 7 of the present invention, and in this figure, the reference numeral 600 indicates a dummy module.

The dummy module 600 does not have a CPU nor a shared memory, both of which are to be originally loaded in the spaces SP3 and SP4. For this reason, the dummy module 600 comprises, for instance, a first input connector 601 connected to a unidirectional bus 606 with an output connector of other module connected thereto, a second input connector 603 connected to a unidirectional bus 608 with an output connector of other module connected thereto, a first output connector 602 connected to a unidirectional bus 607 with an input connector of other module connected thereto, a second output connector 604 connected to a unidirectional bus 609 with an input connector of other module connected thereto, and a switch 605. It should be noted that, although not shown herein, a switch controller having the same function is provided in Embodiment 1 described above.

To describe operations of the dummy module 600, as switching control for input and output to and from a CPU or a shared memory is not required, only switching control from the first input connector 601 or second input connector 603 to the first output connector 602 or second output connector 604 is simply executed. It should be noted that the switching control is executed by a switching controller, like in Embodiment 1, according to address information.

As described above, with this Embodiment 7, a dummy module not having a CPU nor a shared memory is included in a plurality of modules, so that a module used only for data transfer can be incorporated. With this feature, arbitrary data transfer between all modules adapted to a small scale system can be realized. It should be noted that the same effects can be realized with a dummy module having either one of a CPU and a shared memory.

Embodiments of the present invention were described above, but it should be noted that various modifications are possible within a gist of the present invention and are not excluded from a scope of the present invention.

As described above, with the present invention, in module junction with unidirectional data transfer, transfer control is provided in one direction according to inputted data, data processing to be executed, and each destination for transfer, so that the data transfer capability is improved even with low cost configuration, and with this feature there is provided the effect that it is possible to obtain a data processing apparatus which can upgrade performance of a system as a whole.

With the invention, in module junction with a two-directional data transfer, transfer control is simultaneously provided in two-directional mode, according to inputted data, data processing to be executed, and each destination for transfer, so that the data transfer capability is improved even with low cost configuration, and with this feature there is provided the effect that it is possible to obtain a data processing system which can upgrade performance of a system as a whole.

With the present invention, a destination for transfer is determined according to address information correlated to the data to be transferred, so that complicated processing is not required to be performed internally, and with this feature there is provided the effect that it is possible to obtain a data processing apparatus which can easily realize transfer control.

With the present invention, data inputted from outside and data having been subjected to data processing and stored are simultaneously switched to a destination for transfer, so that there is no conflict between data, and with this feature there is provided the effect that it is possible to obtain a data processing data which can smoothly realize transfer control.

With the present invention, before data is transmitted, address information correlated to the data is transmitted, so that it is possible to establish a path for the data before transmission of the data, and with this feature there is provided the effect that it is possible to obtain a data processing apparatus which can establish a data path before execution of actual data transfer.

With the invention, each data processing module is jointed to another data processing module adjoining thereto with a bus, so that, when data is successively transferred through data processing modules, and with this feature there is provided the effect that it is possible to obtain a data processing apparatus which can simultaneously control the data transfer in each data processing module.

With the present invention, of data processing modules, at least a data processing module jointed to a data processing module which is two or more modules ahead is included, so that an extreme difference in a line length between modules can be eliminated by distributing a ling length between the modules and also a delay in data transfer between modules can be suppressed to the minimum level. With this feature there is provided the effect that it is possible to obtain a data processing apparatus which can shorten a time required for data transfer.

With the present invention, a plurality of data processing modules connected serially with a bus, and a transfer direction is reversed at each of data processing modules at both ends, so that bus line length between modules can be kept at a required minimum length, and there is no line path requiring an extremely long time for data transfer between modules, and with this feature there is provided the effect that it is possible to obtain a data processing apparatus which can shorten a time required for data transfer.

With the present invention, a plurality of data processing modules are connected in a circular form with a bus, so that not only bus line length between the modules can be kept at a required minimum length, but also, different from a case in which the modules are connected serially with bus, data can directly be transferred between the modules at both ends, and with this feature there is provided the effect that it is possible to obtain a data processing apparatus which can substantially shorten a time for data transfer between the modules at both edges.

With the invention, a dummy module not used for processing and storing data is included in a plurality of data processing modules, so that a module used only for data transfer can be incorporated, and with this feature there is provided the effect that it is possible to obtain a data processing apparatus which can realize free data transfer between all the modules included in a system well adapted to a small scale system.

This application is based on Japanese patent application No. HEI 9-307335 filed in the Japanese Patent Office on Nov. 10, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data processing apparatus having a plurality of data processing modules connected to each other with a bus in a single direction, each of the data processing modules comprising:
    an inputting unit inputting the data received from some other data processing module functioning as a data transmitter of a plurality of data processing modules connected through a bus;
    an outputting unit outputting the data to some other data processing module functioning as a destination for data transmission of a plurality of data processing modules connected through a bus; and
    a transfer control unit allocating the outputting unit and a data processing/storing unit as destinations for data transfer and simultaneously transferring data inputted from said inputting unit and data inputted from the data processing/storing unit to the destinations respectively.

2. A data processing apparatus according to claim 1, wherein address information is correlated to data and the transfer control unit determines destination of data transfer according to the address information correlated to data to be transferred.

3. A data processing apparatus according to claim 2, wherein said transfer control unit switches a plurality of data simultaneously inputted from the inputting unit and the data processing/storing unit to the destinations respectively after determining the address information correlated to each data to be transferred.

4. A data processing apparatus according to claim 2, wherein the transfer control unit transmits, prior to transmission of data, the address information correlated to the data.

5. A data processing apparatus according to claim 1, wherein each of the data processing modules are connected to an adjoining processing module with a bus.

6. A data processing apparatus according to claim 5, wherein said apparatus includes at least a data processing module connected to a data processing module which is two or more modules ahead of the data processing modules.

7. A data processing apparatus according to claim 1, wherein a dummy module not having the data processing/storing unit is included in the plurality of data processing modules.

8. A data processing apparatus having a plurality of data processing modules connected to each other with a plurality of buses in a single direction, each of the data processing modules comprising:
    a plurality of inputting units inputting the data received from some other data processing module functioning as a data transmitter of a plurality of data processing modules connected through buses;
    a plurality of outputting units outputting the data to some other data processing module functioning as a destination for data transmission of a plurality of data processing modules connected through buses;
    a data processing/storing unit processing and storing data therein; and
    a transfer control unit allocating the outputting units and the data processing/storing unit as destinations for data transfer and simultaneously transferring data inputted from the inputting units and data outputted from the data processing/storing unit to the destinations respectively.

9. A data processing apparatus according to claim 8, wherein address information is correlated to data and the transfer control unit determines destination of data transfer according to the address information correlated to data to be transferred.

10. A data processing apparatus according to claim 9, wherein said transfer control unit switches a plurality of data simultaneously inputted from the inputting unit and the data processing/storing unit to the destinations respectively after determining the address information correlated to each data to be transferred.

11. A data processing apparatus according to claim 9, wherein the transfer control unit transmits, prior to transmission of data, the address information correlated to the data.

12. A data processing apparatus according to claim 8, wherein each of the data processing modules are connected to an adjoining processing module with a bus.

13. A data processing apparatus according to claim 12, wherein said apparatus includes at least a data processing module connected to a data processing module which is two or more modules ahead of the data processing modules.

14. A data processing apparatus according to claim 8, wherein the plurality of data processing modules are serially connected to each other with a buses and the transfer direction is reversed in case of data processing module at the ends.

15. A data processing apparatus according to claim 8, wherein said plurality of data processing modules are connected to each other with buses in a circular form.

16. A data processing apparatus according to claim 8, wherein a dummy module not having the data processing/storing unit is included in the plurality of data processing modules.

* * * * *